(12) United States Patent
Singhal et al.

(10) Patent No.: US 9,953,353 B2
(45) Date of Patent: Apr. 24, 2018

(54) METHOD AND SYSTEM FOR IMPLEMENTING AN ARCHITECTURE FOR A SALES CATALOG

(71) Applicant: Oracle International Corporation, Redwood Shores, CA (US)

(72) Inventors: Ashish Singhal, Union City, CA (US); Ashfaq A. Jeelani, Dublin, CA (US); Vibhor K. Gaur, Foster City, CA (US); Hang Lu, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 826 days.

(21) Appl. No.: 14/015,546

(22) Filed: Aug. 30, 2013

(65) Prior Publication Data

US 2014/0067613 A1    Mar. 6, 2014

Related U.S. Application Data

(60) Provisional application No. 61/694,988, filed on Aug. 30, 2012, provisional application No. 61/780,514, filed on Mar. 13, 2013.

(51) Int. Cl.
G06Q 30/00    (2012.01)
G06Q 30/06    (2012.01)

(52) U.S. Cl.
CPC ..... *G06Q 30/0603* (2013.01); *G06Q 30/0601* (2013.01); *G06Q 30/0623* (2013.01); *G06Q 30/0641* (2013.01); *G06Q 30/0625* (2013.01); *G06Q 30/0627* (2013.01); *G06Q 30/0629* (2013.01)

(58) Field of Classification Search
CPC ....... G06Q 30/0641; G06Q 30/0601–30/0645; G06Q 30/08

USPC .............................................. 705/26.1–27.2
See application file for complete search history.

(56) References Cited

U.S. PATENT DOCUMENTS

| | | | |
|---|---|---|---|
| 6,557,012 | B1 | 4/2003 | Arun |
| 7,712,042 | B2 | 5/2010 | Hernandez-Sherrington |
| 7,730,032 | B2 | 6/2010 | Idicula |
| 7,913,161 | B2 | 3/2011 | Rivas, Jr. |
| 8,230,326 | B2 | 7/2012 | Albornoz |
| 8,326,869 | B2 | 12/2012 | Kolluri et al. |

(Continued)

FOREIGN PATENT DOCUMENTS

WO    WO 2006/047407    5/2006

OTHER PUBLICATIONS

Wong, Eugene. Dynamic Dematerialization: Processing Distributed Queries Using Redundant Data. IEEE Transactions on Software Engineering, vol. SE-9, No. 3, May 1983. pp. 228-232. (Year: 1983).*

(Continued)

*Primary Examiner* — Resha Desai
*Assistant Examiner* — Lindsey B Smith
(74) *Attorney, Agent, or Firm* — Vista IP Law Group, LLP

(57) ABSTRACT

A sales catalog interface, wherein the architecture allows the user the ability to controllably view the data with certain engines either running or not running, so that certain items of detailed information is either displayed or not displayed to the user. Data from engines may include, price, eligibility, and availability, may be retrieved synchronously or asynchronously, and may be based upon consumer context, such as account type, geography, etc.

32 Claims, 22 Drawing Sheets

(56) References Cited

U.S. PATENT DOCUMENTS

| | | |
|---|---|---|
| 8,555,157 B1 | 10/2013 | Fu |
| 8,862,991 B2 | 10/2014 | Harrington |
| 2001/0032209 A1 | 10/2001 | Duxbury |
| 2003/0115547 A1 | 6/2003 | Ohwada |
| 2003/0120579 A1* | 6/2003 | Carter, III ............ G06Q 20/201 705/36 R |
| 2005/0125781 A1 | 6/2005 | Swamy et al. |
| 2005/0177436 A1 | 8/2005 | Menninger |
| 2006/0122914 A1* | 6/2006 | Moroney .......... G06F 17/30867 705/26.62 |
| 2007/0050407 A1 | 3/2007 | Chen |
| 2007/0192362 A1 | 8/2007 | Caballero |
| 2007/0226196 A1 | 9/2007 | Adya |
| 2007/0230488 A1 | 10/2007 | Yu |
| 2007/0239742 A1 | 10/2007 | Saha |
| 2008/0034282 A1 | 2/2008 | Zernik |
| 2008/0082572 A1* | 4/2008 | Ballard ............. G06F 17/30392 |
| 2008/0097934 A1 | 4/2008 | Carter, III |
| 2008/0133618 A1 | 6/2008 | Kawabe |
| 2008/0134025 A1 | 6/2008 | Harada |
| 2008/0208714 A1* | 8/2008 | Sundaresan ............ G06Q 10/10 705/26.3 |
| 2008/0208732 A1 | 8/2008 | Guttman |
| 2008/0235260 A1 | 9/2008 | Han |
| 2008/0275907 A1 | 11/2008 | Han |
| 2010/0095129 A1 | 4/2010 | Wilson |
| 2010/0100427 A1 | 4/2010 | McKeown |
| 2010/0275152 A1* | 10/2010 | Atkins .................. G06F 17/212 715/788 |
| 2010/0293234 A1* | 11/2010 | Schmidt ............. G06Q 30/0603 709/206 |
| 2011/0029634 A1 | 2/2011 | Gimson |
| 2011/0231576 A1* | 9/2011 | Blaszczak ............. G06F 12/023 709/246 |
| 2013/0018849 A1 | 1/2013 | Johnston |
| 2013/0036352 A1 | 2/2013 | Hui |
| 2013/0275363 A1 | 10/2013 | Wu |
| 2014/0012882 A1 | 1/2014 | Poppitz |

OTHER PUBLICATIONS

Non-final Office Action dated Jul. 16, 2015 for related U.S. Appl. No. 14/015,553.

Final Office Action dated Oct. 8, 2015 for related U.S. Appl. No. 14/015,560.

"PeopleSoft Enterprise Catalog Management," Oracle PeopleSoft Enterprise, Dec. 2002 (13 pages).

Notice of Allowance and Fee(s) Due dated Feb. 10, 2016 for related U.S. Appl. No. 14/015,553.

Non-final Office Action dated Mar. 19, 2015 for U.S. Appl. No. 14/015,560.

Non-final Office Action dated Aug. 26, 2016 for related U.S. Appl. No. 14/015,560.

Non-final Office Action dated Sep. 1, 2016 for related U.S. Appl. No. 14/015,577.

Non-final Office Action dated Mar. 10, 2017 for related U.S. Appl. No. 14/015,560.

Final Office Action dated Mar. 10, 2017 for related U.S. Appl. No. 14/015,577.

Non-final Office Action dated Oct. 24, 2017 for related U.S. Appl. No. 14/015,577.

Notice of Allowance and Fee(s) Due dated Nov. 3, 2017 for related U.S. Appl. No. 14/015,560.

* cited by examiner

2
METHOD AND SYSTEM FOR IMPLEMENTING AN ARCHITECTURE FOR A SALES CATALOG

CROSS-REFERENCE TO RELATED APPLICATIONS

The present application claims the benefit of priority to U.S. Provisional Patent Application Ser. No. 61/694,988, entitled "METHOD AND SYSTEM FOR IMPLEMENTING AN ARCHITECTURE FOR A SALES CATALOG", filed Aug. 30, 2012, and U.S. Provisional Patent Application Ser. No. 61/780,514, entitled "METHOD AND SYSTEM FOR IMPLEMENTING AN ARCHITECTURE FOR A SALES CATALOG", filed Mar. 13, 2013, both of which are hereby incorporated by reference in their entireties.

The present application is related to U.S. Ser. No. 14/015,553, entitled "METHOD AND SYSTEM FOR IMPLEMENTING VERSIONS OF A SALES CATALOG", U.S. Ser. No. 14/015,560, entitled "METHOD AND SYSTEM FOR IMPLEMENTING PRODUCT GROUP MAPPINGS", and U.S. Ser. No. 14/015,577, entitled "METHOD AND SYSTEM FOR IMPLEMENTING A CRM QUOTE AND ORDER CAPTURE CONTEXT SERVICE", all filed on even date herewith and all hereby incorporated by reference in their entirety.

BACKGROUND

The present application relates to software development and more specifically to systems, methods, and patterns for implementing enterprise software applications.

Many types of business logic are implemented by enterprise software applications. For example, Consumer Resource Management (CRM) applications often implement business logic to perform price quotations and order capture for customers. For the price quotation business logic, a pricing engine may be implemented to receive input data (e.g., product name or product ID) and to return output data that includes the price for each product in the input data. In addition, the pricing engine may receive inputs context-related inputs such as account type and/or location information, as prices may differ depending on types of accounts or geographical regions.

A sales catalog is a set of data commonly accessed by CRM applications. The sales catalog may be accessed, for example, by the business logic that is used to perform price quotations and order capture for customers.

The consumers of the data within the sales catalog may wish to access that data in different ways. For example, the user of the sales catalog may wish in one circumstance to view the data with certain engines running so that detailed eligibility or price information is displayed to the user. On the other hand, the user may wish in other circumstances to view the data without these eligibility or prices engines to be running.

SUMMARY

According to some embodiments of the invention, provided are systems, methods, and computer program products to implement a more efficient architecture for a sales catalog. In some embodiments, the architecture provides the user the ability to controllably view the data with certain engines either running or not running, so that certain items of detailed information is either displayed or not displayed to the user.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Figure 1A:
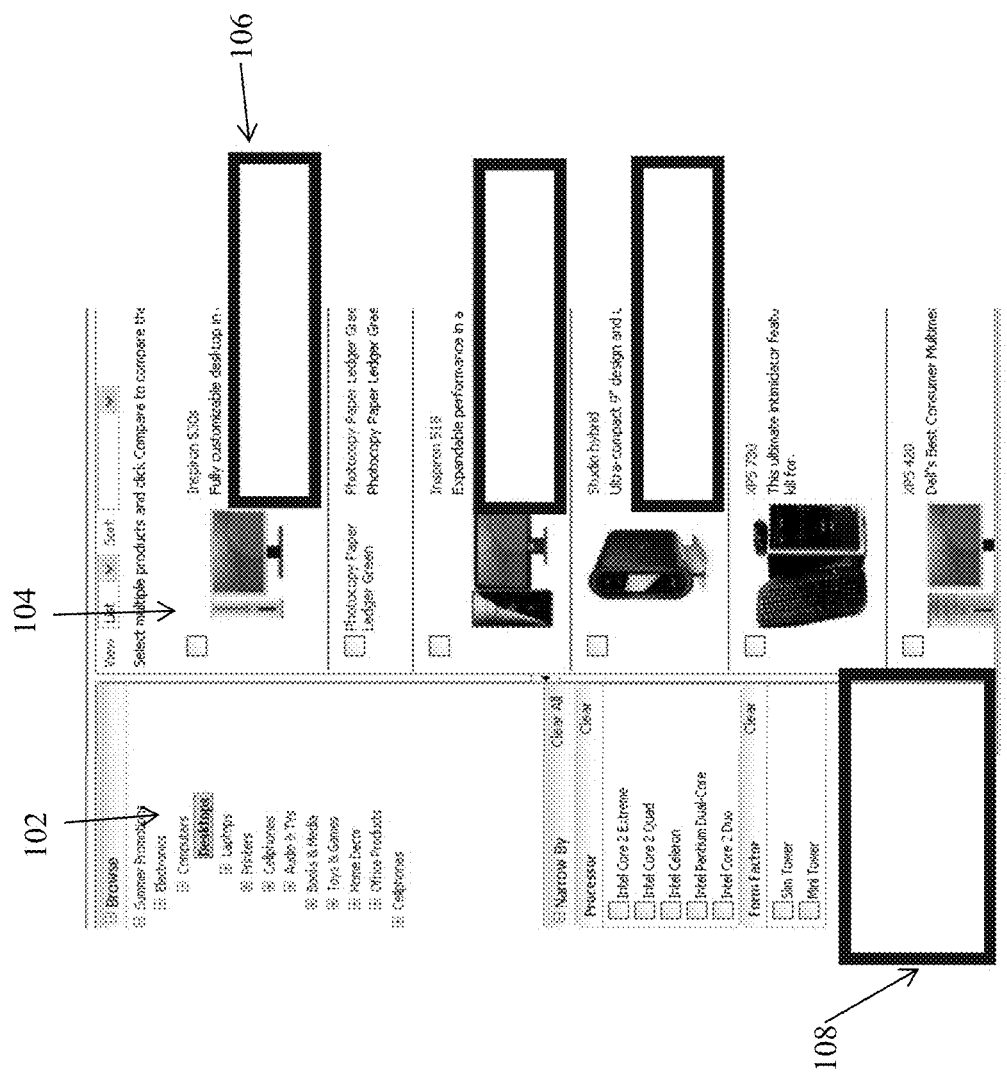
FIGS. 1A-B illustrate example sales catalog displays with engines disabled and engines enabled in accordance with some embodiments.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of mobile applications that receive additional role and environment information. It is noted, however, that the invention is not limited in its scope to these types of applications and this set of additional information, and indeed, may be applied to other types of applications and information as well.

The invention provides systems, methods, and computer program products to implement a more efficient architecture for a sales catalog. In some embodiments, the architecture provides the user the ability to controllably view the data with certain engines either running or not running, so that certain items of detailed information is either displayed or not displayed to the user. Engines may be used in order to provide additional information from external engine services. For example, a pricing engine may be used to dynamically determine a price for one or more products using an external pricing service, based on a customer's account type, geography, and/or other context factors. Other types of engines may include eligibility engines, compatibility engines, availability engines, and territory management engines.

The catalog system may support browsing of the consumer context (e.g. order, opportunity), searching within a catalog/category, narrow-by capabilities to further filter products, the ability to define UI behavior based on context, the ability to show pricing specific to the context (e.g., customer, location), the ability to show eligible products to the user, and allowing for the comparison of products.

Figure 1B:
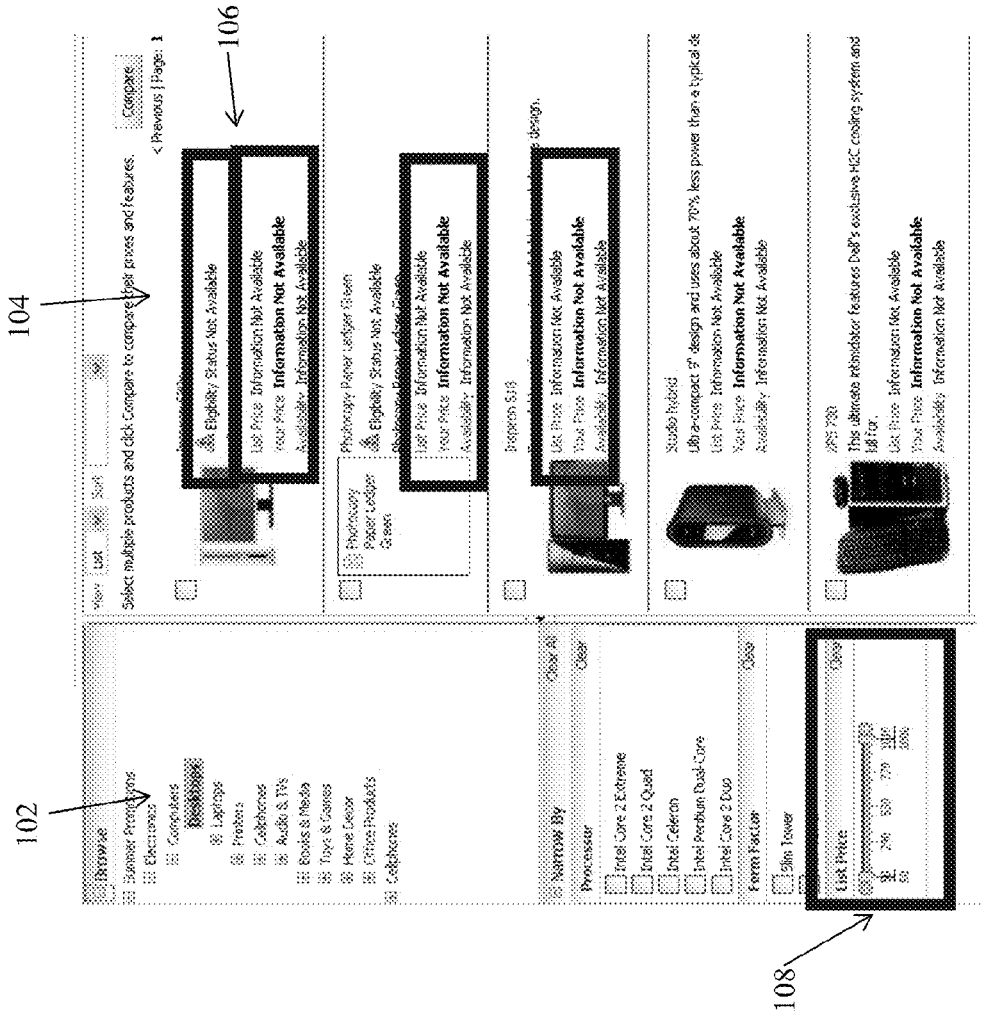

FIGS. 1A and 1B illustrate an example of a use case for some embodiments. FIG. 1A illustrates access to a sales catalog with no engines running for the display, while FIG. 1B illustrates access to the sales catalog where multiple engines have been enabled. As can be seen in the figures, FIG. 1A illustrates a display area for UI navigation 102 and a display area for a plurality of products 104. UI navigation area 102 may comprise one or more UI elements for searching or navigating a sales catalog, such as a product and category hierarchy displayed as an expandable tree, or a narrow-by search that may be configured to filter the products displayed in display area 104 by certain criteria or product features. The UI may also comprise areas 106 and 108 where engine information such as price, product eligibility, or product availability may be displayed. However, because no engines have been enabled, no additional data is displayed, and areas 106 and 108 are empty.

On the other hand, FIG. 1B illustrates a sales catalog display with engines turned on. The displayed sales catalog includes additional engine information retrieved from various engines (e.g., price, availability, etc.), displayed in areas 106. In addition, FIG. 1B may contain additional search and navigation controls 108 associated with one or more of the enabled engines, providing the users with increased options for the searching, selection, and/or filtering of products. For example, enabling a pricing engine may allow a price range slider to be displayed in the search and navigation area 108, allowing a user to refine narrow by search with a specific price range. Other engines if enabled may be associated with different types of additional search and/or navigation controls.

Overall Architecture

Figure 2A:
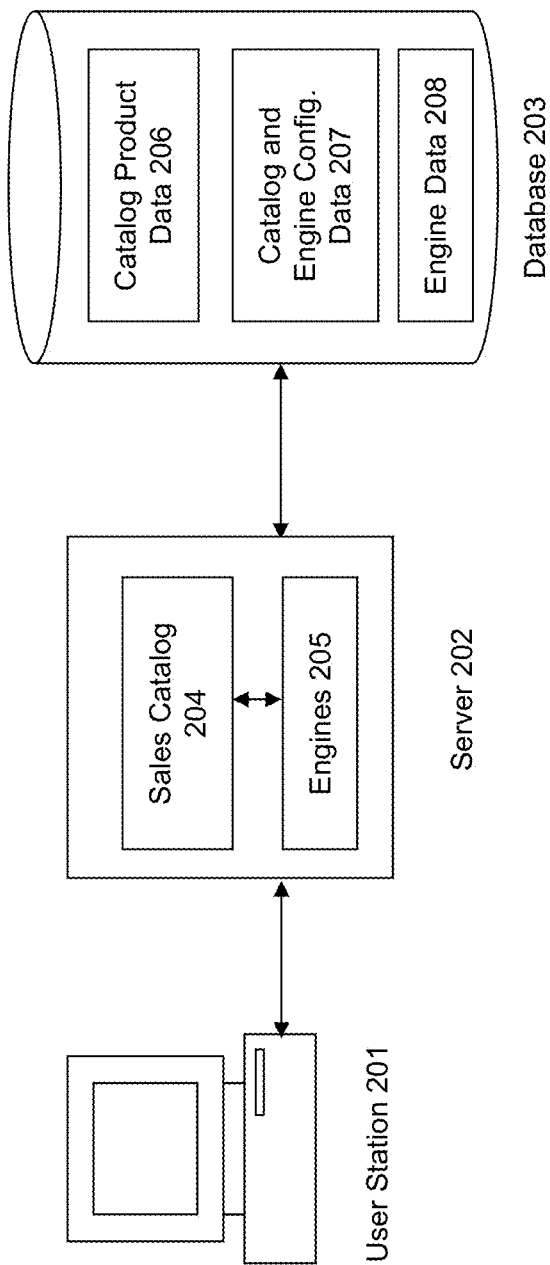
FIG. 2A illustrates a system for implementing a sales catalog in accordance with some embodiments.

FIG. 2A shows an architecture of a system for implementing a sales catalog system according to some embodiments. The users operate the system at user station 201 to access and utilize applications on an application server 202, such as the sales catalog application 204 and one or more engines 205. A database 203 comprises the sales catalog product data 206, sales catalog and engine configuration data 207, and engine data 208. As described in more detail below, the users may use the sales catalog application 204 to retrieve and display information from sales catalog product data 206. In some embodiments, sales catalog application 204 may filter or modify sales catalog product data 206 before it is displayed to the user. The user may also supplement the retrieved catalog data by interfacing with the engines 205, which may access or retrieve data from engine data 208 in order to generate supplemental engine results for the user. The user may also configure the appearance and behavior of catalog application 204 and engines 205 by modifying the catalog and engine configuration data 207. In some embodiments, this may be done by through one or more user interfaces provided by the sales catalog application 204.

The user station 201 comprises any type of computing station that may be used to operate or interface with the application server. Examples of such user stations include for example, workstations, personal computers, laptop computers, or remote computing terminals. The user station 201 comprises a display device, such as a display monitor or screen, for displaying interface elements and report data to the user. The user station 201 may also comprise one or more input devices for the user to provide operational control over the activities of the system, such as a mouse, touch screen, keypad, or keyboard. The users of the user station 201 may correspond to any individual, organization, or other entity that uses system to access applications on application server 202. For example, the users of user station 201 may be sales representatives or customers.

The database 203 may correspond to any type of computer readable mediums or storage devices. The computer readable storage devices comprise any combination of hardware and software that allows for ready access to the data within the database. For example, the computer readable storage device could be implemented as computer memory or disk drives operatively managed by an operating system.

Figure 2B:
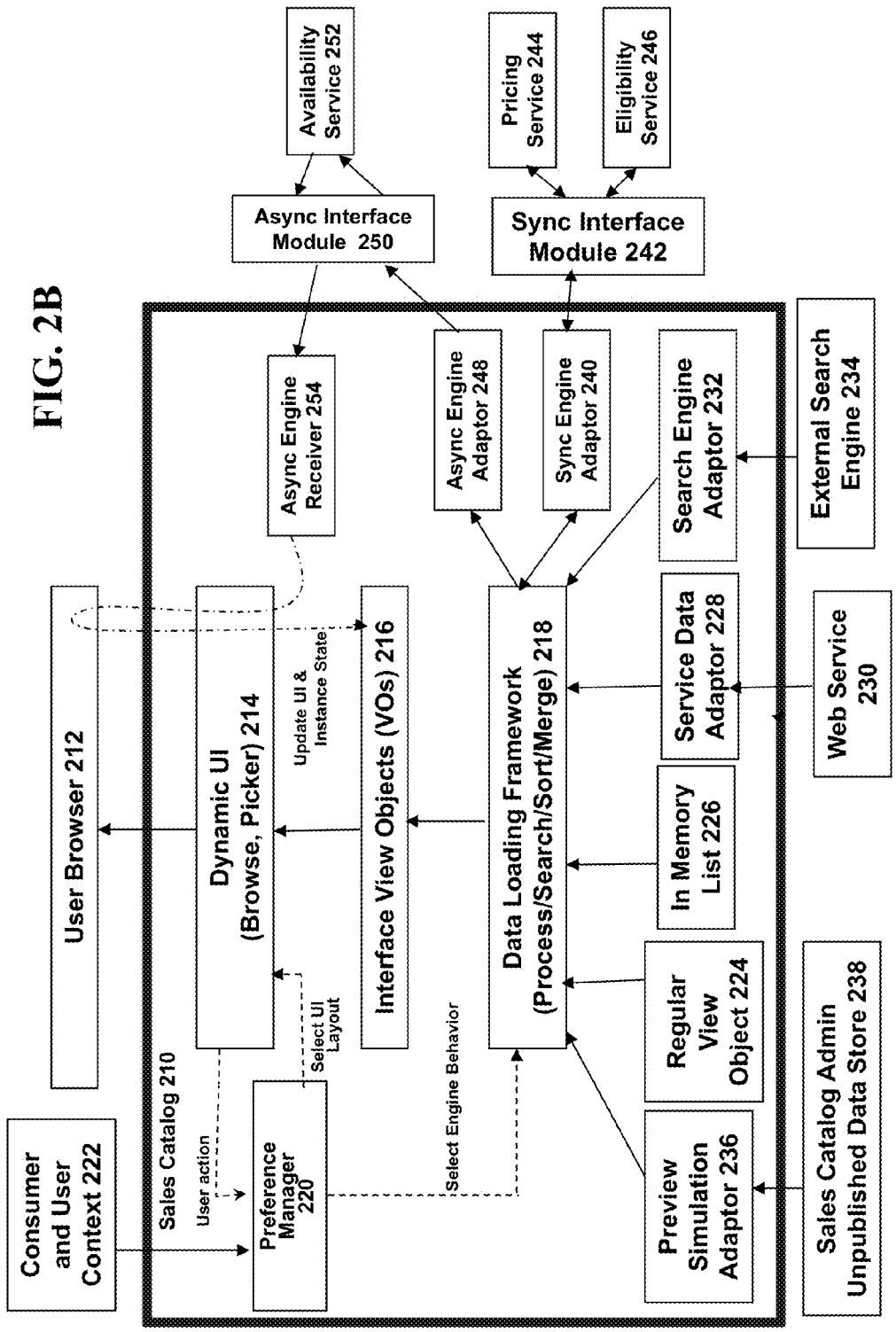
FIG. 2B illustrates a sales catalog system in accordance with some embodiments.

FIG. 2B illustrates a sales catalog system 210 at runtime in accordance with some embodiments. The main components of the sales catalog system may comprise a user interface (UI) 214, a data loading framework 218 for loading interface view objects (VOs) 216, engine processing 240 and 248, and a consumer/navigation context preference setting manager/loader 220.

The user station may be used by a user to access the sales catalog system 210. In some embodiments, the user may be a sales representative accessing the sales catalog system 210 using a sales framework, wherein the sales catalog system 210 is launched through another application in the framework, such as a sales prediction application, marketing application, sales opportunity application, etc. In some embodiments, the user may access the system 210 through a browser 212, such as Microsoft Internet Explorer, Mozilla Firefox, or Google Chrome.

In some embodiments, the UI 214 may be a dynamic UI implemented through a dynamic region, which allows the user to specify different layouts for various regions of the UI (e.g., catalog, category, narrow-by search, etc.) based on consumer scenario and navigation context, and to select or deselect various engines.

For example, the catalog may have a display area where a user may specify a product category (e.g., electronics, computers, or laptops), another area where a user may narrow the results of a product search by specific product attributes (e.g., Intel processors, has over 4 GB RAM, etc.), as well as an area to display the actual product information.

The UI 214 allows the user at user browser 212 to specify specific layout options for these regions, altering the way in which the data will be presented to the user (e.g., where the data appears in the display area, what kind of UI controls are displayed, format in which it is displayed, such as a list, table or grid, etc.). In addition, the user at user browser 212 may be able to use the UI 214 to turn on or off one or more engines for obtaining additional information, such as price, eligibility, territory management, and/or product availability engines.

The consumer/navigation context preference setting manager/loader 220 (hereinafter, preference manager 220) may be used to perform loading and/or determination of settings on what layout to display and what engines to run. In some embodiments, the inputs from the user at the UI 214 specifying various layout options and/or engine selections are received by the preference manager 220. In addition, preference manager 220 may also receive a consumer context 222.

Consumer context 222 may comprise information relating to a consumer of the sales catalog system 210. This may include information how the sales catalog 210 was launched. For example, in some embodiments, the sales catalog 210 may be launched from different applications in a sales framework, such as an opportunity application, sales application, or lead capture application. The behavior of sales catalog 210 and how it is able to be displayed may change based at least in part on the launching application. The consumer context 222 may also contain information such as customer location, credentials, or account type, etc., that is passed or generated by the consumer (e.g., launching application). Certain UI layout display options may be enabled or disabled depending on a customer's geographic region, account type, and/or other context information. In some embodiments, the user may override some of the selections based on consumer context 222 made by preference manager 220.

Inputs at UI 214 to preference manager 220 may also include a current catalog context, or information relating to the current level of browsing in the sales catalog. For example, product eligibility information may not be relevant when a user is viewing product categories at a high level, and only relevant when the user is viewing specific products. Thus, a high-level catalog context may cause the preference manager 220 to turn off an eligibility engine or not allow it to be selected.

The preference manager 220 may take input from both UI 214 and consumer context 222 to configure the layout of UI 214 that is displayed to the user at the user browser 212. The preference manager 220 also sends engine behavior selection information to the data loading framework 218, to determine which engines will be used and how they will be used. Thus, different UI layouts based on consumer usage context and/or navigation context may be rendered.

The actual data to be displayed by the UI 214 may be provided by an instance layer. The instance layer may comprise a set of programmatic view objects (VOs) 216 (hereinafter, interface VOs) built on top of a common data loading framework 218. A view object (VO) may refer to any database object that that defines a subset of the rows and columns from a row set. Data loading framework 218 may be configured to load data from various different data sources, such as by using regular database queries, web service index searches, and/or retrieving unpublished data for preview. The data loading framework 218 may interact with various service engines which may include both synchronous invocations and asynchronous invocations.

The data loading framework 218 may be configured to support multiple data sources and mappings. In some embodiments, the data source(s) may be changed at runtime, (e.g., through calculated expressions, such as Groovy). The data loading framework 218 may support merging, sorting, and/or de-duplication of data retrieved from the various data sources, order by operations, and translation of search criteria specified at UI 214 into formats that can be understood by the data sources, if applicable.

Available data sources may include existing regular VO(s) 224, or in-memory lists 226, wherein entries from the lists may be processed and formed into one or more VOs. The data may be loaded using SQL queries or other types of query commands. In some embodiments, data loading framework 218 may also access data from external web services 230 through one or more service data adaptors 228.

The data loading framework 208 may also integrate with an external search engine 234 through a search engine adaptor 232. This may facilitate retrieving data that is stored in different formats or using different types of data structures.

Preview functionality may be provided in some embodiments by an admin unpublished data store 238 through a preview simulation adaptor 236. This may be used to allow an administrator to view how a sales catalog will appear to a user and test its functionality, before the catalog is actually published.

The data loading framework 218 may be configured to load data from these different sources and merge them to form the interface VOs 216 to be displayed to the user at user browser 212 using the UI 214. In some embodiments, forming interface VOs 216 comprises joining data retrieved from one or more engines, depending on the engine configuration specified by the user and consumer context.

The engine processing comprises certain mechanisms, including for example, synchronous processes and/or asynchronous processes. In some embodiments, SQL calls and/or call-back plug-ins may be used. These will be described in more detail below.

Synchronous engine processing is used for supplementing the information contained in the view objects in real time. When using synchronous processes, the data loading framework 218 does not return interface VOs 216 to be displayed to the user until the additional synchronous engine information is retrieved. Synchronous engine processes may be used, for example, when the engine process may be executed quickly or cheaply. In some embodiments, these may include pricing and/or eligibility engines.

To retrieve engine information synchronously, the data loading framework 218 may use a synchronous engine adaptor 240, which communicates with one or more interface modules 242 to retrieve the additional engine information from the one or more engine services (e.g., a pricing service 244 and/or an eligibility service 246). The retrieved information is then returned to the data loading framework 218 through interface module 242 and synchronous engine adaptor 240, where it is combined with information loaded from the various data sources at the data loading framework 218 to form the interface VOs 216 that are displayed to the user.

In some embodiments, asynchronous processes may be used for obtaining additional engine information. Asynchronous processing may be used, for example, in cases where data would take longer or be more expensive to retrieve, is not within the control of the entity that manages system 210, or otherwise any other circumstance that may not be amenable to using a synchronous process. For example, in some embodiments, accessing a procurement environment to determine product availability may be slower or more expensive than the processes for determining price or eligibility, and thus an availability engine may be configured to use asynchronous processes. For asynchronous processes, the data loading framework 218 does not wait for the additional engine information to be retrieved. Instead, interface VOs 216 may be created with one or more placeholders for the additional engine information. When the additional engine information is retrieved, the interface VOs 216 and the display at the UI 214 may be updated with the new information.

To retrieve engine information asynchronously, the data loading framework 218 may use an asynchronous engine adaptor 248 to communicate with one or more asynchronous interface modules 250 to retrieve additional information from one or more asynchronous engine services, such as a product availability service 252. The retrieved information is then sent back through the asynchronous interface module 250 to an asynchronous engine receiver 254.

In some embodiments, before information from asynchronous engine processes is retrieved, a placeholder may be displayed to the user (e.g., "information not yet available," "loading data," etc.). When the information is received, the UI 214 may be updated and the additional information received from the engine is integrated within the display, such as by updating the interface VOs 216 in the instance layer, and pushing the updated interface VO 216 to be displayed by refreshing portions of the UI 214. In some embodiments, the updating of UI 214 is done using a series of messages and callbacks between the UI 214 and the instance layer. These may be implemented using an Active Data Service (ADS), a standard push channel provided by an Application Development Framework (ADF), available from Oracle Corp., from Redwood Shores, Calif.

The UI 214 interacts closely with the instance layer containing interface VOs 216, where user interaction at the UI 214 will feed back into the instance layer and the preference settings, so that these navigation contexts will drive the UI and engine behavior. For example, in some embodiments, a user can enable/disable pricing information and eligibility information on different catalog categories (e.g., view pricing information for the "desktop" category but not the "laptop" category).

Beside the standard dependency where the UI 214 relies on the instance layer to render the data on various regions, the UI navigation may affect the engine status and engine behavior on the instance layer, which in turn affects what to render on the UI 214 and what actions are to be allowed on the UI 214.

Figure 2C:
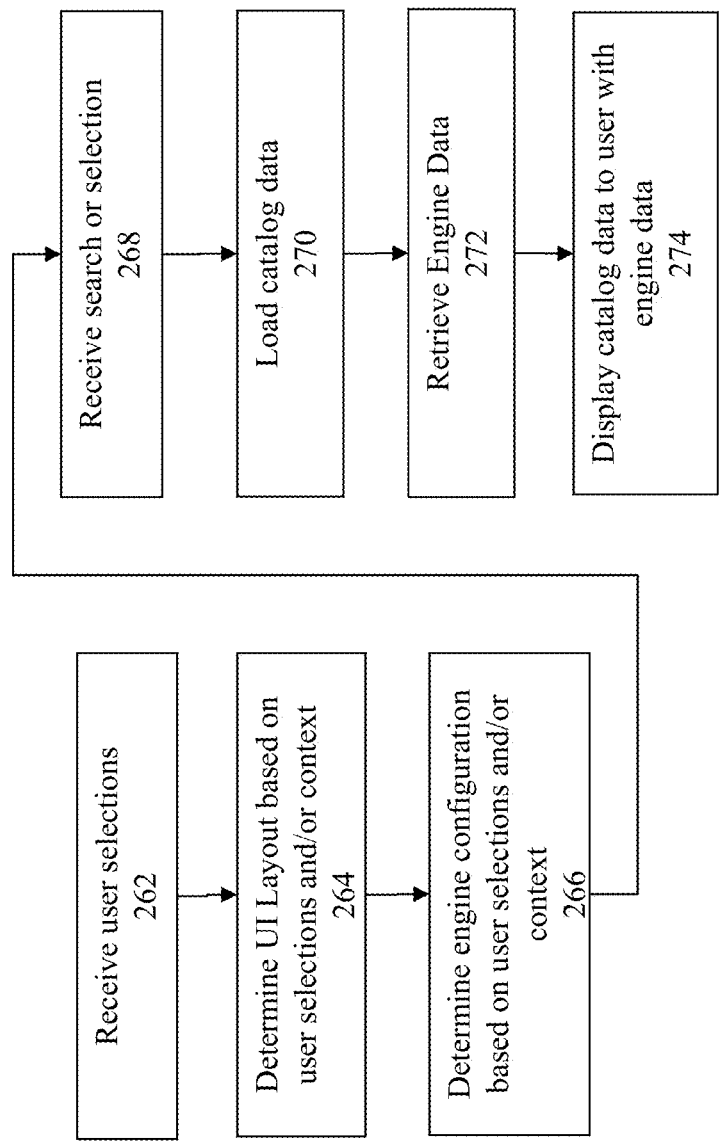
FIG. 2C illustrates a flowchart of an approach to implement a sales catalog in accordance with some embodiments.

FIG. 2C illustrates a flowchart of an approach for implementing a sales catalog in accordance with some embodiments. At 262, a user makes one or more selections or inputs. These selections may be made at a dynamic UI, and may comprise one or more UI layout selections and/or one or more engine configuration selections. The UI layout selections may comprise any type of selection for configuring the appearance and/or functionality of a sales catalog UI, which may include configuring how and where different functions (e.g., search, content display) are displayed and how they may be interacted with (e.g., types of search, UI features such as checkboxes, drop-down menus, etc.). Engine configuration may include not only which engines to use, but may also include configurations for selected engines. For example, in some embodiments, a pricing engine may be configured to return a simple price or a complex price.

At 264, a UI layout and configuration may be determined based on the user selections. The UI layout and configuration may in some embodiments also be based on a consumer context. Context may include user information (e.g., account type, location, etc.), consumer context information (e.g., from what program was the sales catalog launched from), and/or current catalog context information (e.g., what part of the catalog is currently being viewed or requested). The context information may cause specific settings to be used, or disallow certain settings from being used. In some embodiments, the user selections may override the context information in setting the UI layout and configuration.

At 266, an engine configuration is determined based on the user selections and/or context information. In some embodiments, certain types of engines may be available only in certain contexts. For example, a particular engine may only be available to users with a certain account type, or are located in a certain region. In addition, availability of some engines may be based upon the current catalog context. For example, in some embodiments, a pricing engine may not be available for a category-level catalog context, but be available for a product-level catalog context.

At 268, a search or selection from a user may be received. The search or selection may be a keyword search, a search by category or product feature, a narrow by search, a selection of a category in a tree or hierarchy, or any other use action that may potentially cause a change in the content displayed by the sales catalog. The types of searches or selections that will be available will depend on the UI layout and configuration. In addition, certain searches may be available depending on engine configuration. For example, in some embodiments, a narrow by price search option may be available if a pricing engine is configured to be on.

In some embodiments, certain optimizations for user search and selection may be included. For example, in some sales catalog embodiments, products and categories may be organized as a deep tree, with multiple subcategory layers. If a user selects a product category with single subcategory on the path, the system may automatically recursively expand the tree so that the user can reach a meaningful node with a minimal number of clicks. For example, if the user select a product category that (either before or after filtering by engines and/or territory management) contains only one subcategory, the system may be configured to automatically expand into the subcategory, and continue to do so until the bottom of the tree or hierarchy, or a category with more than one product or subcategory, is reached.

At 270, sales catalog data is loaded based on the received search or selection. The catalog data may be converted into VOs to be displayed in the UI. In some embodiments, the loaded data is based on existing VOs. Data may also be loaded from an in-memory list or other type of data structure, and then dynamically converted into VOs. Loading the catalog data may also comprise combining additional information with the VOs, such as catalog context information.

At 272, engine data is retrieved in accordance with the engine configuration. Engine data may be retrieved synchronously or asynchronously. In some embodiments, engines may also be used to filter results from a user search. For example, a territory management engine may assign certain products to certain users (e.g., a particular sales rep is assigned the "desktop" and "laptop" product categories, but not the "audio devices" category), and may be used to filter out results corresponding to products not assigned to the user so that they are not displayed.

At 274, the catalog data may be combined with the engine data to be displayed to the user. In some embodiments, where engine data is retrieved asynchronously, the catalog data may be displayed first with one or more placeholders, and refreshed later when the engine data becomes available.

Data Loading

Figure 3:
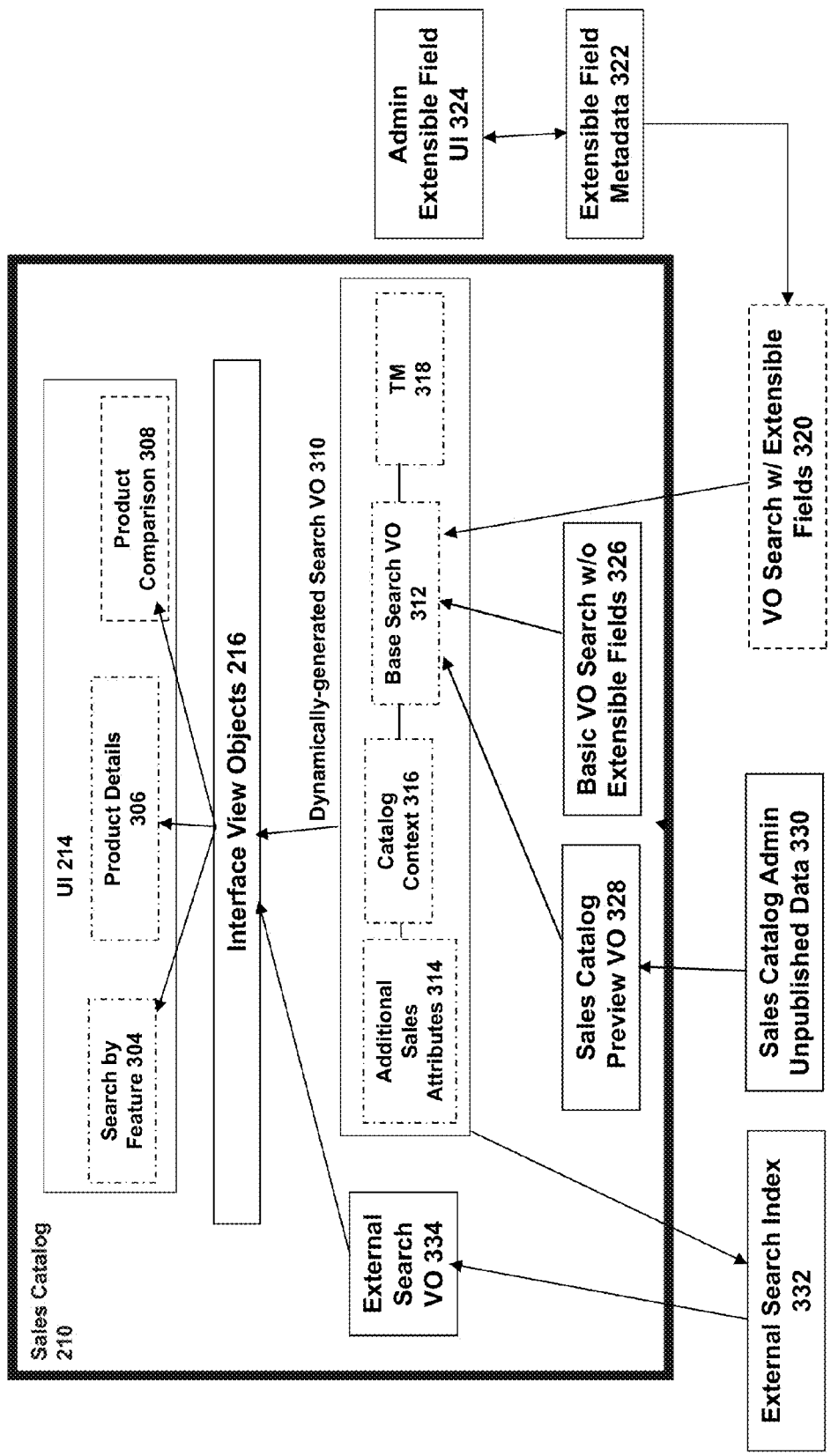
FIG. 3 illustrates data loading for a sales catalog system in accordance with some embodiments.

FIG. 3 provides a more detailed illustration an approach for data loading for a sales catalog system 210. The VOs loaded by the system may be created at design time. However, in some embodiments, the VOs can also be dynamically created at runtime.

The user may enter an input or search at a search UI 214 (e.g., using catalog search, comparison function, or feature in detail, etc.) to display one or more interface VOs 216, which may be created at design time or dynamically at runtime. Different types of searches or selections may be used at UI 214, which may include searching by one or more product features 304, making one or more product detail selections 306, and/or requesting product comparisons 308.

In some embodiments, the interface VOs 216 comprise dynamically generated search VOs 310. Search VOs 312 may comprise base search VOs 312 joined with additional information, such as territory management (TM) information 318, catalog context and/or hierarchy information 316, and/or additional attributes 314. In some embodiments, which additional information is joined is based on what is exposed on the UI 214 and needed to render the comparison/details on the UI 214.

Additional sales attributes 314 may include attributes such as price and eligibility. Data for the additional attributes may be obtained from the plurality of engines. A catalog context 316 may also be joined, which specifies the context of the data within the sales catalog, such as a product category that the product is a part of.

In some embodiments, different products may be assigned to different sales organizations or sales reps. The territory management (TM) information 318 may specify whether a product or category is assigned to the user. In some embodiments, an interface VO 216 for a product is only displayed if the user is assigned the product by the TM information.

The additional information (attributes 314, context 316, and TM information 318) may thus be merged or joined with a base search VO 312 to form a dynamically created search VO 310.

The base search VO 312 may be obtained from a variety of different sources. In some embodiments, it may be inherited from a search 320 implemented with an extensible field framework. The data specifying the extensible fields may be stored in metadata services (MDS) 322. The extensible field framework allows for, in addition to a default set of product fields, additional extensible fields to be associated with certain products and/or categories. For example, some products or categories (e.g., laptops) may be modified using extensible fields to have additional product or category specific attributes (e.g., screen size) that may not be applicable or relevant for products of other categories (e.g., DVD players). The extensible fields metadata stored in metadata services 322 may be defined at an administrator's extensible field UI 324, which may be implemented as an Applcore setup UI. In some embodiments, the search 320 may be done using SQL queries or other types of database queries.

The extensible fields framework may not always be available, and so a basic search 326 without extensible fields can be used in some embodiments to obtain the base search VO 312 when extensible fields functionality is not deployed or is defective. The user will still be able to navigate, search the catalog, see price through a pricing engine service, and retain other basic functionality, but may not able to perform advanced search, view, or compare detailed item info functions on the extended attributes. Search 320 with extensible fields or search 326 without extensible fields may be done using one or more SQL queries or other types of queries.

In some embodiments, base search VO 312 may be a sales catalog preview VO 328 loaded from unpublished data 330. This allows users to preview how a sales catalog will appear with the UI 214 before it is published.

Interface VO 216 may also be based on an outside search engine, such as SES (Secured Enterprise Search) implemented on a vlx system. An external search index 332 may be used to retrieve a search VO 334 to form the interface VO 216. One or more VOs may be used to crawl and generate the index during application setup. These can be either design time VOs or dynamically generated VOs 310. This type of search may be used for data stored in different types of formats or data structures. In some embodiments, the search VO 334 may also be combined with additional info such as context, attributes, and/or TM information. In other embodiments, the index 332 may already include some of the additional information that was part of the VOs 310 used to generate the index. In some embodiments, the type of search to be done (e.g., external search engine search, SQL search) may be determined by catalog and consumer context.

Engine Integration

The engine integration layer is used to bring in additional business information outside of the sales catalog. According to some embodiments, types of engine integration may include: synchronous web service calls (may be used to display price info and eligibility info), asynchronous web service calls (may be used to display availability/in-stock information), direct loading and/or filtering through one or more SQL joins (may be used to enforce visibility based on sales rep's territory assignment), and callback to a consumer plugin to let the consumer decide what to do and what to display (may be used by the consuming application to hide a product and/or disable "add to cart").

Figure 4A:
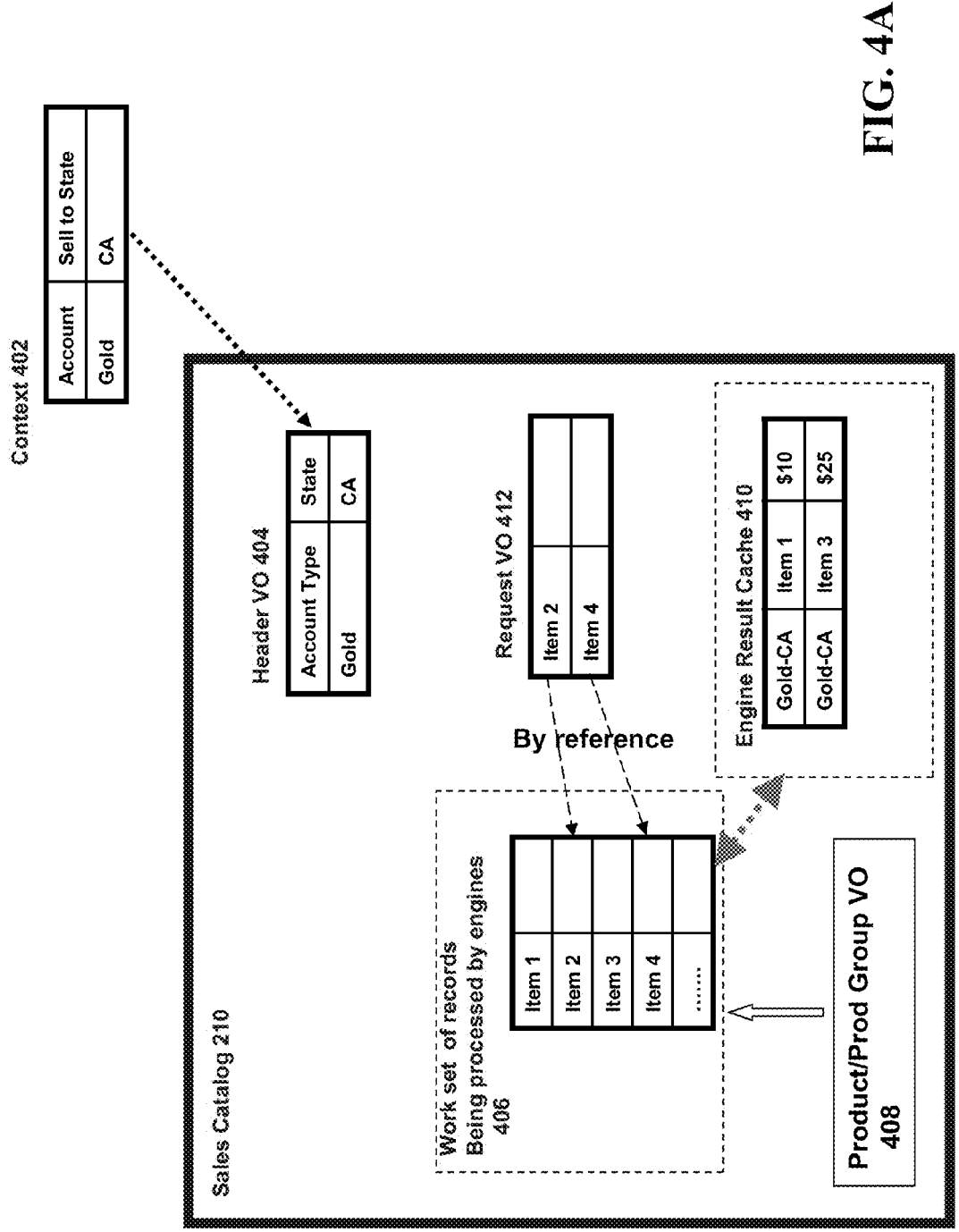
FIGS. 4A-C illustrate synchronous engine processing for a sales catalog in accordance with some embodiments.
Figure 4B:
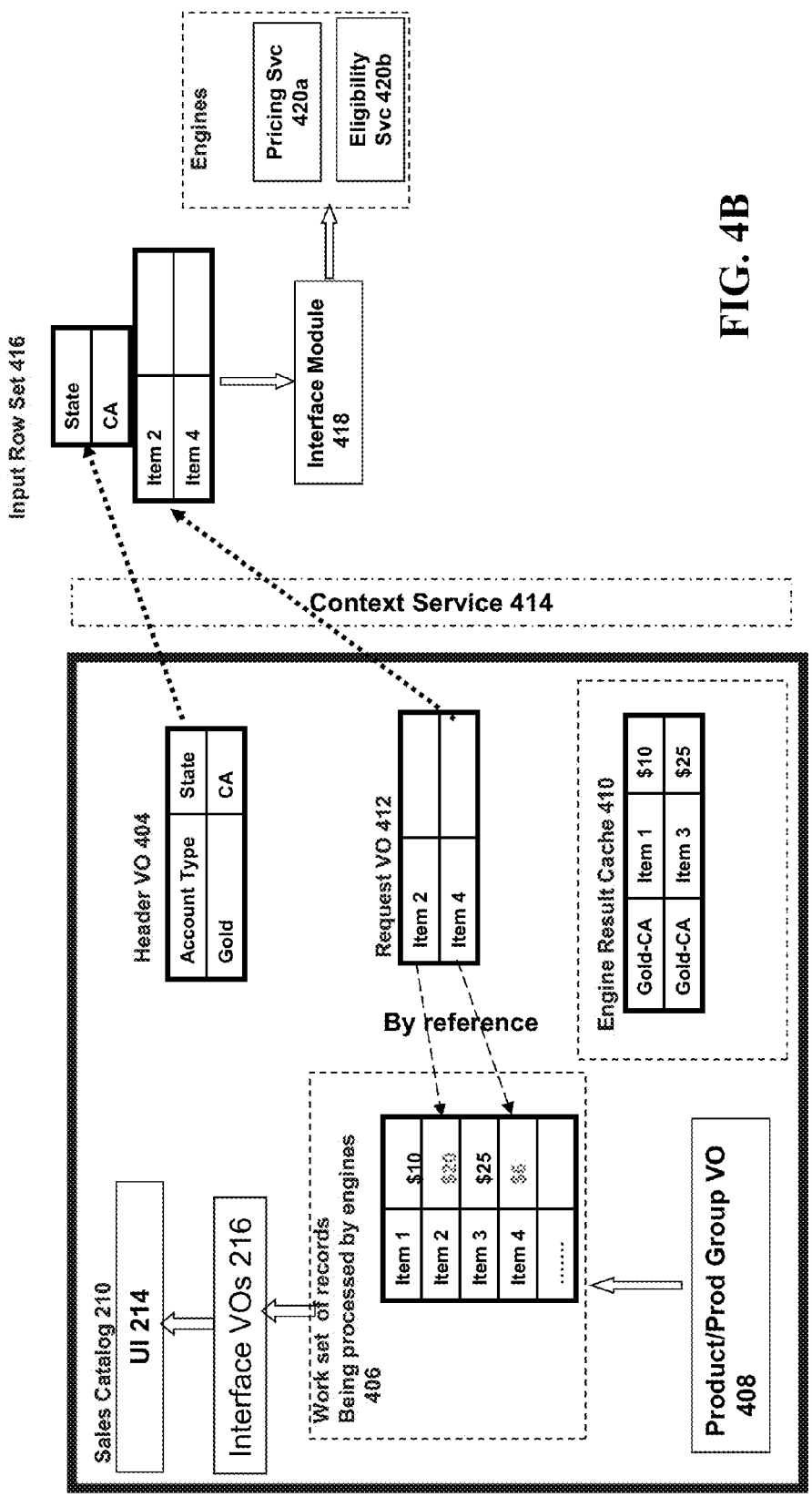
Figure 4C:
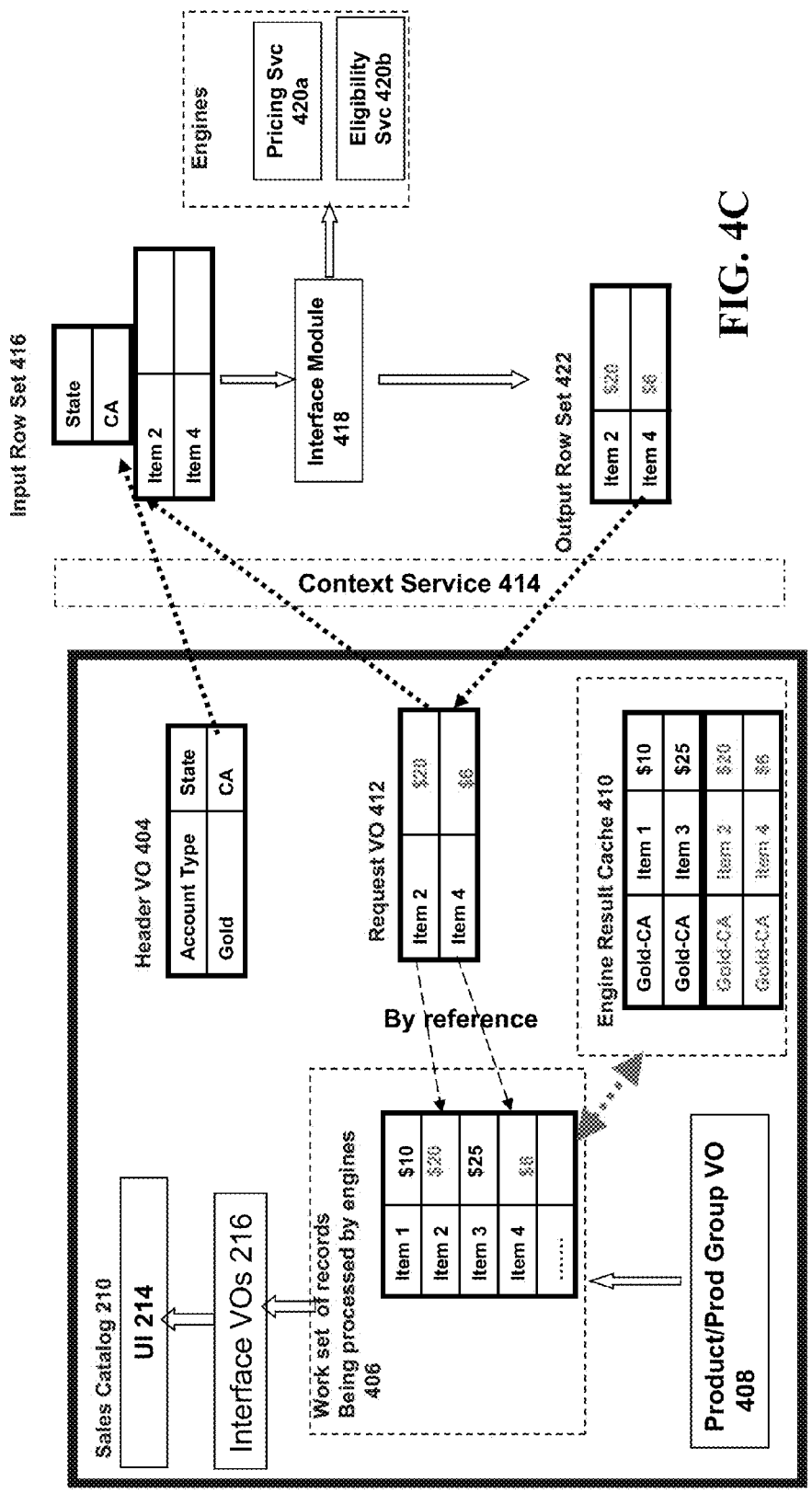

FIGS. 4A-C provides a detailed illustration of an approach to implement synchronous engine integration in accordance with some embodiments. This approach provides engine integration using synchronous web service calls, and is used to retrieve and display additional product information in real time, which may include pricing information, eligibility information (e.g., is a customer eligible to purchase the product?), and/or compatibility information (e.g., is the product compatibility with existing products in a customer's assets/profile or shopping cart?).

When the consumer launches the catalog, they may pass context information to the system, such as opportunity or order information. In some embodiments, context information may first be converted to a standard header. The header may then be cached and used as context for future service invocations. For example, in FIG. 4A, the context 402 indicates that a customer has an account type of "Gold" and a sell to state of "CA." The relevant context information from context 402 is converted into a context header 404 that will be used for invoking the engine. This is because the engine (e.g., a pricing engine) may return different data (prices) for the same product or category depending on the consumer context (account type, state).

In some embodiments, service invocation results from the engines may be cached. When a working set of data 406 is retrieved, such as from a group of product VOs 408, a cache 410 may be checked to see whether the engine results are already available. For example, as illustrated in FIG. 4A, the working set of data 406 comprises records for item 1, item 2, item 3, and item 4. Engine results for records corresponding to item 1 and item 3 are available in the cache 410, while results for item 2 and item 4 are not. Thus, engine results for items 1 and 3 may be retrieved directly from the cache 410, while records for items 2 and 4 are formed into a request VO 412 to be sent to the engine.

As illustrated in FIG. 4B, for those rows which do not have results in the cache (item 2 and item 4), the system will send a request VO 412 correspond to those rows to the engine web service through a context service 414. An example framework for context services for sales catalogs is described in U.S. patent application Ser. No. 14/015,577, "Method and System for Implementing a CRM Quote and Order Capture Context Service", which is hereby incorporated by reference in its entirety.

The context service 414 transforms the request VO 412 into an input row set 416 that is in a format expected by the external engine service. In some embodiments, the input row set 416 also comprises formatted information from the header VO 404. For example, header VO 404 formed from the consumer context 402, and request VO 412 containing the requested rows are sent through the context service 414 for the engine and formatted to form an input row set 416 that is understood by the external pricing engine. Input row set 416 is then sent to an engine interface module 418 to invoke the selected engine service(s), such as a pricing service 420a or an eligibility service 420b.

In FIG. 4C, pricing service 420 outputs results through the interface module 418 in the form of an output row set 422. The data of output row set 422 may go through a reverse-transformation process, and used to populate the fields of the request VO 412. The request VO 412 with the newly retrieved engine results then populates the data set used for UI rendering (record work set 406). Cache 410 may also be updated so that the engine results can be saved for future requests, e.g., preventing the system from having to make the service call repeatedly. The record work set 406 with the retrieved engine information may then be converted into one or more interface VOs 216 for display to the user at UI 214.

The cache 410 may be maintained with multiple layers, and may also depend on the different engines used by the system. In some embodiments, the cache may depend on the context 402, such as a customer zip code, so that if the zip code changes, the cached price will be no longer valid, and the system will drop the cache and all future inquiry for a product's price will need to trigger a new engine service call for recalculation. In some embodiments, the consumer just needs to perform a one-time mapping of context to the cache.

In some embodiments, the consumer context 402 is converted to a header VO 404 on initialization so that all the integration will be done through a standardized sales catalog context, transparent to the original consumer context (e.g., context of the application launching the sales catalog). The results for engine service calls are cached (such as in a session level cache), and the cache key may include a header context to keep the results accurate if customer context (e.g., location) was changed (e.g., from CA to NY), and only unprocessed rows will be sent to the engine to improve performance.

Sometimes, certain engines may not have data or rules for all pages/items/products. These may include, for example, eligibility and/or compatibility engines (collective E/C engine), but generally not pricing engines (all products in the catalog should have pricing information). Thus, in some embodiments, pages/items/products may have a flag marking whether or not corresponding E/C information exists. Thus, when invoking the E/C engine, the row sets for E/C invocation may be pre-filtered to avoid invocation if a page/item/product is not marked for E/C, in order to reduce the number of rows/invocation to the engine. The configuration also avoids E/C calls during certain user actions unless E/C filtering is on, deferring the invocation until when the E/C is really needed. For example, the user interface may contain an expandable tree with product categories or groups (e.g., tree 704 in FIG. 7), and be configured such that expanding the tree would not invoke an E/C call because no E/C information is displayed with the tree categories. On the other hand, user actions causing data to be displayed that does include E/C information (e.g., selecting a category in the tree to display the products associated with the category), may invoke E/C service calls. In some embodiments, the row sets used by the engines may be shared among different engines to avoid excessive copy and memory usage.

In some embodiments, if an engine call (e.g., E/C call, pricing call) has failed, the system may mark the result as "Info Unavailable" on the UI 214 without blocking product selection. The system may also avoid invocation for specified time (e.g., 10 minutes) to allow engines to recover and achieve better performance (e.g., failed engine invocation is 10 times slower than successful invocation).

Figure 5A:
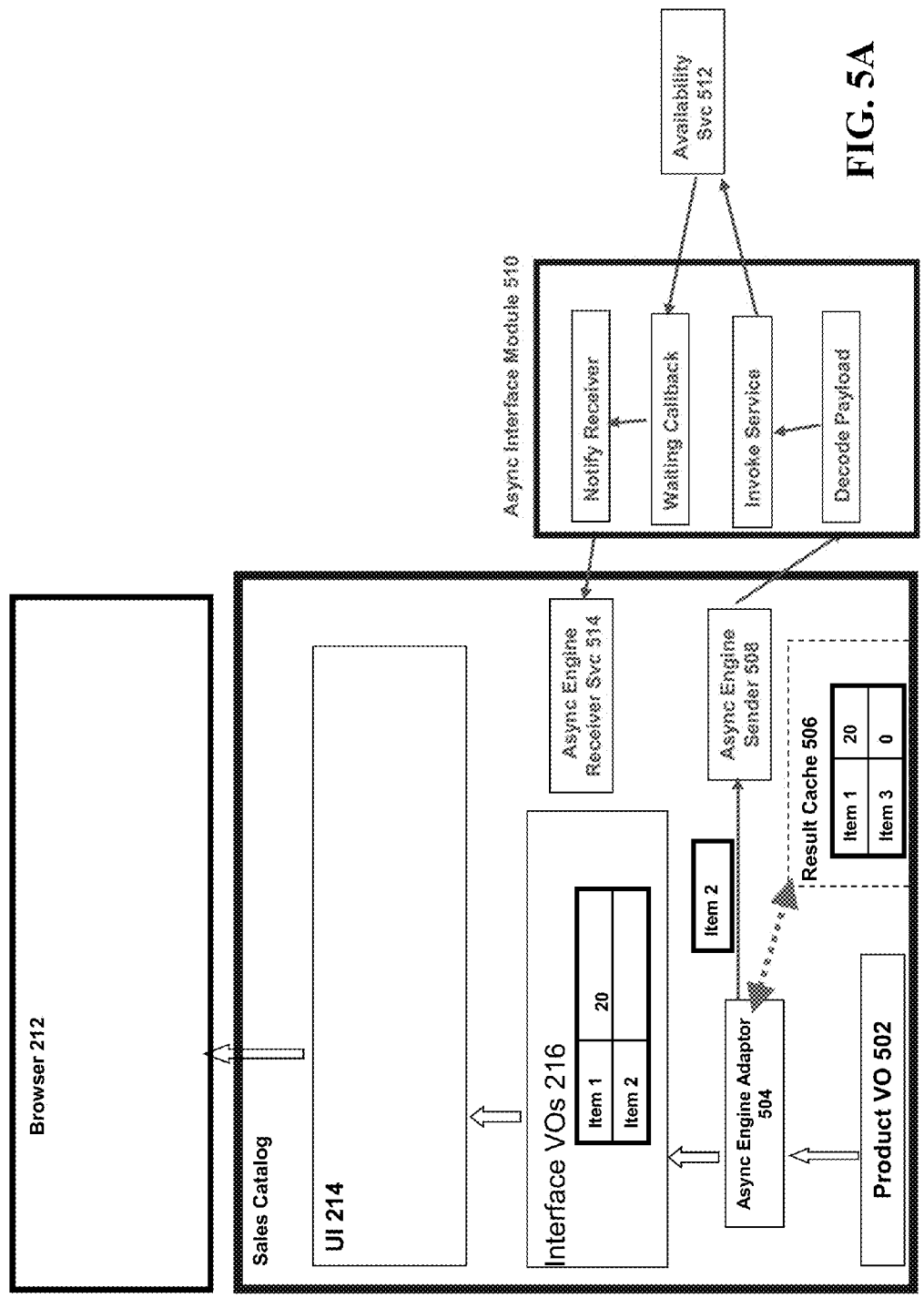
FIGS. 5A-C illustrate asynchronous engine processing for a sales catalog in accordance with some embodiments.
Figure 5B:
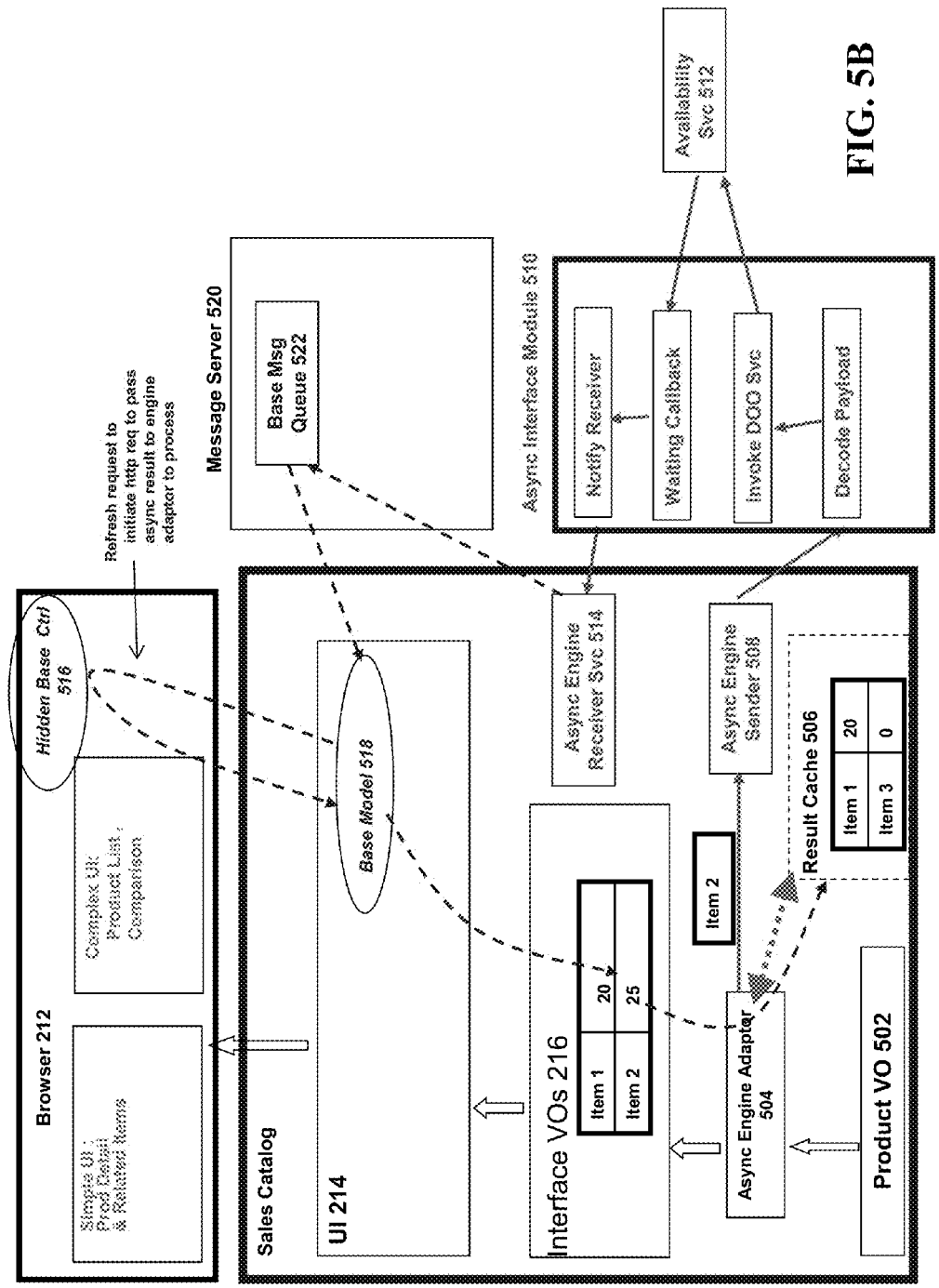
Figure 5C:
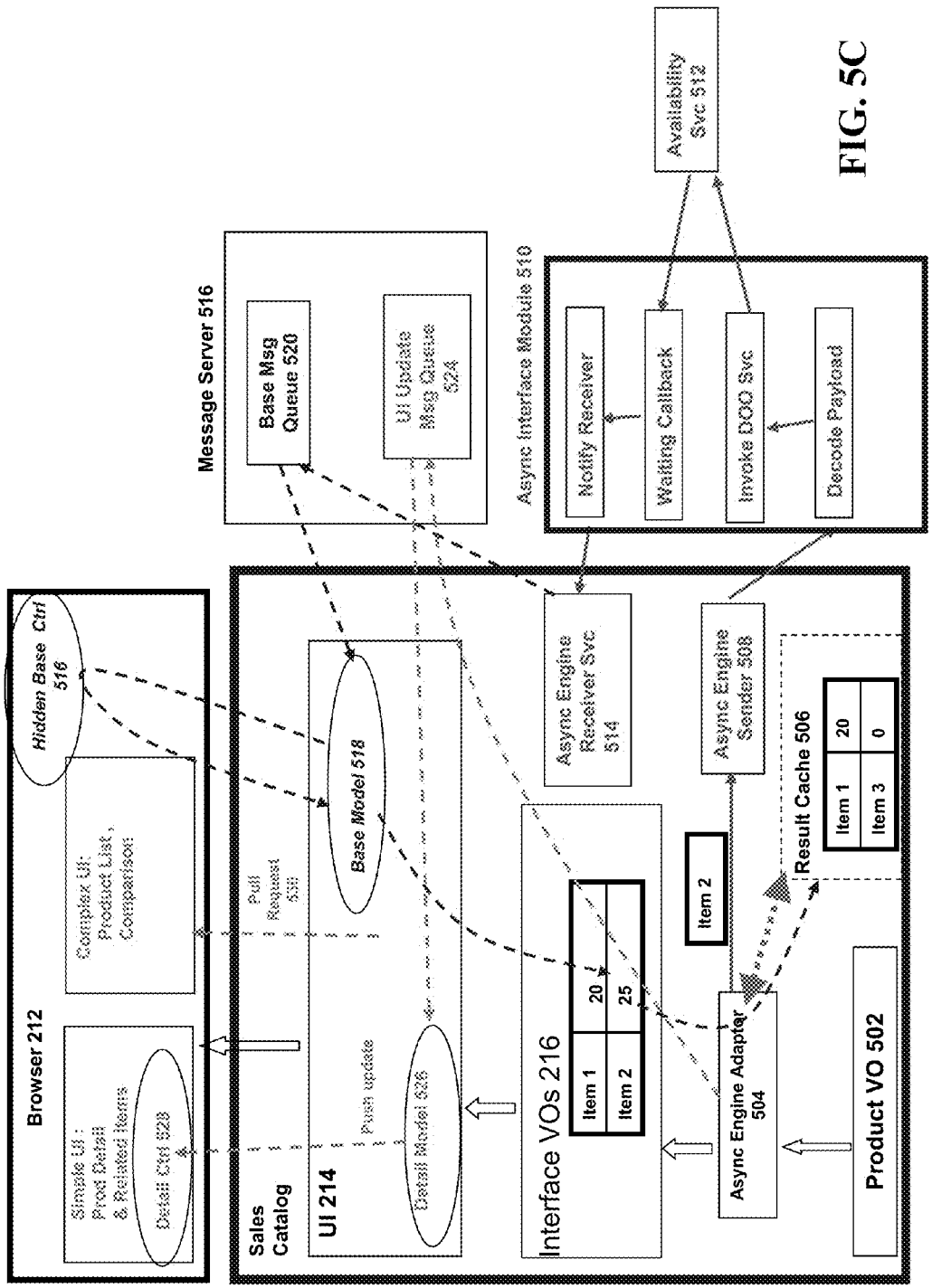

FIGS. 5A-C provide a detailed illustration of an approach to implement asynchronous engine integration in accordance with some embodiments. In some embodiments, when retrieving additional information from an engine asynchronously, the UI may be rendered with partial results while the engine retrieves the remaining information.

A generic interface module (such as a BPEL (Business Process Execution Language) wrapper) may be used to invoke external engine services asynchronously and provide call back to the sales catalog receiver service. The receiver, upon receipt of the engine results, may then trigger a refresh so that the UI may be updated with the received information.

Before making an engine service call, the system may first check a result cache to see whether it has already made calls for the same product before. In some embodiments, the cache is by default configured to be long-living and at the application level. This is because for some asynchronous engines, such as an availability engine, the engine results may change over time, but unlike other factors such as price or eligibility may not change with customer account type or other context information. The system only sends unfound rows to the engine service, and since it is asynchronous, only an event is raised to trigger the engine service on the other side, but the rest of the data will render on the UI right away without waiting for the engine service results to be returned. To support that, several communication objects (e.g., ADS objects) may be registered into one or more message queues (e.g., JMS message queues implemented using a JMS message server). In some embodiments, two separate message queues are used.

While the UI is rendered and communications object registered, the asynchronous engine service continues and once finished, may call back to a receiver service on the sales catalog side. The receiver service sends a message to the first message queue, which will notify a first set of hidden communication objects. The first set of communication objects then triggers a communication event (e.g., ADS event) to propagate the results to the interface VOs in the instance layer and to update the cache. In some embodiments, the communication event may comprise passing the engine results to an http thread to post the results to the engine adaptor to update the status of the VO. The system will then send a second message to the second message queue, which will be responsible to trigger the UI to perform a refresh to pick up the change.

One reason to use the two message queue round trip is because by the time an asynchronous engine service call completes, the user may have already navigated away from the original UI which triggered the asynchronous engine call. If the system only uses the second message to update the UI, the message may be lost as the original receiver is no longer there. However, since it is such an expensive call, the system may still want to capture the service call result. That is why the system routes through a hidden receiver so that it can capture the service result, so that even though the user may navigate away from current UI, the user is likely to be performing comparison/drilldown and might come back to this product again.

For example, as illustrated in FIG. 5A, product VOs 502 are sent to an asynchronous engine adaptor 504. In some embodiments, the asynchronous engine adaptor 504 first checks a cache 506 to determine if the engine result data is already available. For example, product VOs 502 may comprise VOs for an item 1 and an item 2. Availability information for item 1 is already cached in cache 506, while information for item 2 is not. Therefore, information for item 1 is retrieved from cache 506, while a request is made for item 2 to an asynchronous engine sender 508.

The asynchronous engine sender 508 makes a request to the engine service. In some embodiments, the request may first go through an interface module 510. The request may include additional context information, similar to the synchronous engine processing illustrated in FIGS. 4A-C. In some embodiments, consumer context information is not used, as some types of information, such as product availability, may not depend on consumer context.

The interface module 510 may decode the payload of the request and/or format the request so that it can be read by the engine service 512 (e.g., availability service). Interface module 510 then invokes the engine service 512 and waits for a callback. When the callback from engine service 512 is received, the interface module 510 notifies an asynchronous engine receiver 514.

While the payload is sent for processing at the engine, product VO 502 may be processed and formed into interface VO 216 without waiting for the engine results. Interface VO 216 may include the retrieved cached engine data (e.g., for item 1) as well as additional information (e.g., from other engines). The interface VO 216 is then displayed through the UI 214 to the user at user browser 212. In some embodiments, a placeholder is displayed, to be refreshed/replaced with the engine results when they are received. The placeholder may contain text such as "Information not yet available" or "data loading . . . " to indicate to the user that additional information is being retrieved from an asynchronous engine.

In some embodiments, a hidden control 516 (e.g., an ADS control) may be sent to the user browser 212, wherein that communicates with a base model 518 (e.g., an ADS model). Base model 518 and base control 516 may be used to propagate the engine results when they are received to the interface VOs 216 and cache 506.

As illustrated in FIG. 5B, the receiver 514 may signal a base message queue 522 in message server 520 upon receipt of the engine data. In some embodiments, message server 520 first communicates with base model 518 and base control 516. This may trigger the propagation of the results to the interface VOs 216 in the instance layer. The results may also be stored in the cache 506.

In some embodiments, as illustrated in FIG. 5C, the asynchronous engine adaptor 504 signals a UI update message queue 524 in message server 520, which interfaces with the detailed model and controls 526 and 528 to push the received engine results on the updated interface VO 216 to be displayed in the UI 214. In some embodiments, this may be done by triggering a refresh of regions of the UI 214 corresponding to the information to be updated, so that the engine results in the updated interface VO 216 will be displayed to the user.

In other embodiments, instead of using the second message queue (UI update message queue 524), polling may be used. Pull requests 530 are sent from the client-side to pull the engine results after they are received. In some embodiments, pull requests 530 may be sent at periodic intervals. This technique may be used for more complex UI configurations (e.g., more graphics heavy UI configurations, UIs where the information needed to be updated is scattered in multiple regions on the UI, such as product lists and/or product comparisons). In some embodiments, polling comprises triggering periodic refreshes of data areas or regions on the UI 214, so that engine results that have been received may be viewed by the user.

Filtering and TM Integration

Some engines used by sales catalog system 210 may be configured to pre-filter data from one or more data sources, in order to reduce the amount of data that needs to be loaded and processed. In some embodiments, this may be done by calculating an overall range for which to query the data sources, in order to obtain a ballpark set of data that is then be used for further processing.

Figure 6:
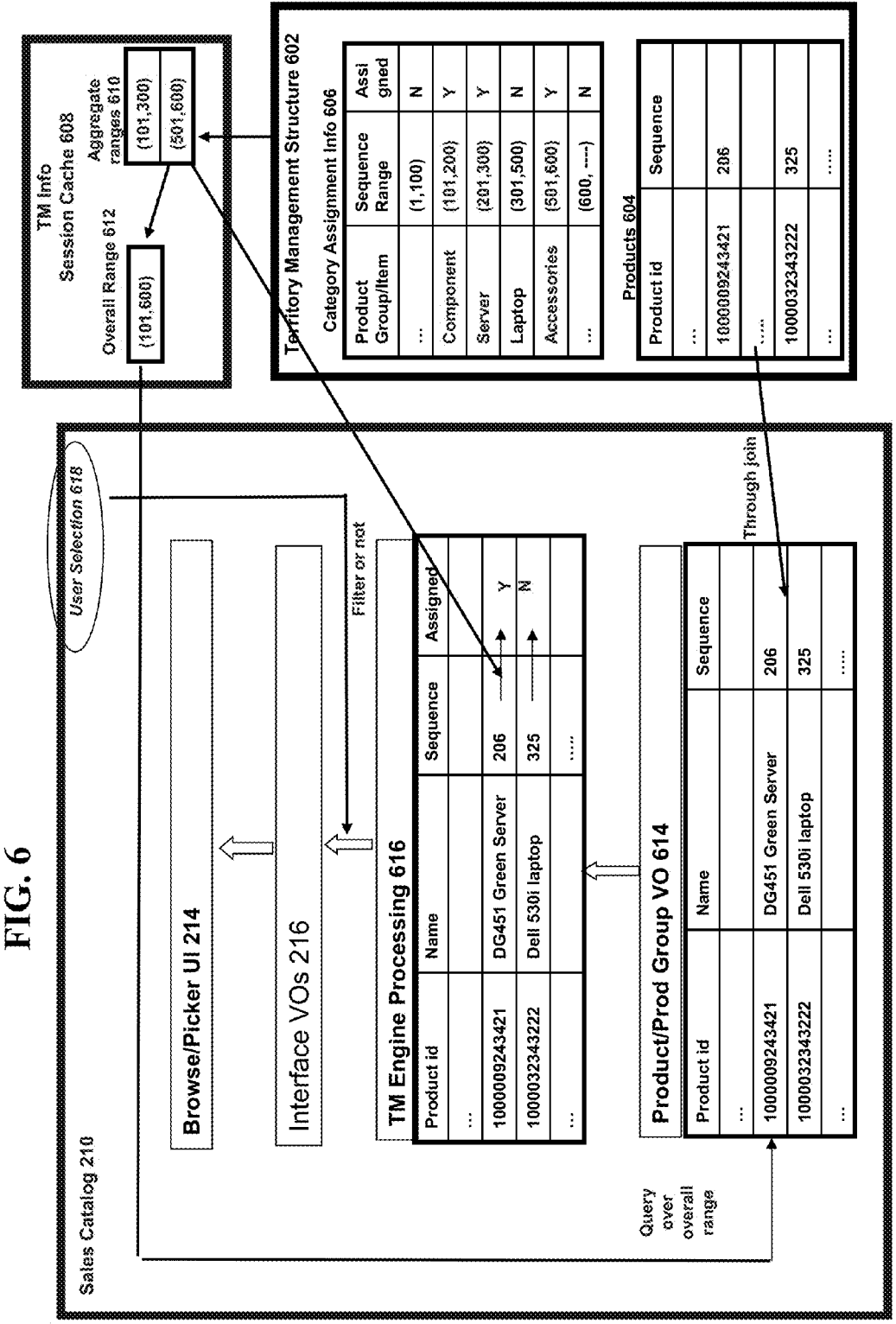
FIG. 6 illustrates territory management (TM) filtering for a sales catalog in accordance with some embodiments.

FIGS. 6 and 7 illustrate this approach through an example implementing territory management (TM) integration in accordance with some embodiments. TM integration in accordance with the illustrated embodiments may be used to provide for cheaper integration by reducing the number of data rows that need to be processed, where the cost includes only one additional indexed join and cost once per session invocation to a TM API to retrieve aggregate assignment info. This approach may to used to achieve efficient TM integration by leveraging a territory management public API and assignment info arranged in sequences. TM information may be merged or cached into a minimal array of sequence assignment ranges, so that item/page sequence information may be obtained through direct outer join to compare with cached assignment array.

This approach adds additional SQL criteria to directly reduce the number of rows retrieved from a database directly when TM filtering is enabled. It also allows the user to turn on/off TM filtering by single click when enabled (e.g., using a check-box on the UI).

FIG. 6 illustrates integration with TM visibility filtering through an efficient SQL query followed by additional processing. One of the integration implementations is for the sales catalog is to be able to filter the catalog to only those products the current user or sales rep is assigned to work on are retrieved. In some embodiments, the system first obtains an aggregate of all the assigned ranges, so that it can obtain a minimum and maximum value for the assigned range. The database data may be joined with a data structure containing the range mappings, in order to apply the aggregate range (e.g., as a where clause in a query). This provides a ballpark list of potential candidates which fall in the assigned range and significantly cuts down on the number of records to be loaded. Once the data is loaded, the system then uses the index value from the join to compare with the exact assignments to decide whether it needs to be further filtered. The consumer can decide whether they want to enforce this visibility or not, and they can also choose whether the user is allowed to change this visibility mode.

In FIG. 6, the assignment information is stored in territory management structure 602, where each product is given a unique index, and the system stores the range of indices for the assignment. For example, FIG. 6 illustrates that each product ID may be associated with an index at 604, such that products in the same category have indices within the same range. Thus, product categories can be associated with a range of indices at 606. In some embodiments, TM structure 602 may be in the form of the tree.

A TM cache 608 may be used to store the aggregate ranges 610 that a particular user is assigned to. For example, the user in FIG. 6 is assigned to products in the "Component," "Server," and "Accessory" categories, corresponding to the ranges (101-200), (201-300), and (501-600). In some embodiments, adjacent ranges may be combined, so that the aggregate ranges 610 of products the user is assigned to may be expressed as (101-300) and (501-600).

An overall range 612 may be calculated based on the aggregate ranges 610. In some embodiments, the overall range 612 may be the range defined by the maximum and minimum values of the ranges assigned to the user (aggregate ranges 610). For example, in FIG. 6, the overall range 612 for the user is expressed as (101-600), encompassing all the values between the minimum and maximum values in aggregate range 610.

If the user selection 618 indicates that TM filtering will not be used, then all product group VOs 614 may be retrieved for processing at TM engine processing 616. However, if user selection 618 indicates that TM filtering is on, the overall range 612 may be used to query or pre-filter (e.g., using an SQL query with the range specified by a WHERE clause) the database containing the product group VOs 614, so that only product VOs within the range defined by overall range 612 are retrieved to be processed at TM Engine processing 616. In some embodiments, a join of product group VOs 614 with the TM structure 602 containing the assignment information is performed. Assignment information for the retrieved VOs may then be checked on an individual product level, so that only products assigned to the user are displayed. This technique allows for creating efficient queries that may greatly reduce the amount of data that needs to be processed. For example, the total number of product VOs 614 may number into the thousands, while using the overall range 612 makes it so that a much smaller number of VOs need to be processed and filtered.

In some embodiments, overall range 612 comprises a single overall range. However, in other embodiments, the overall range 612 may comprise multiple ranges. The number of ranges in 612 may be optimized to provide a good balance between the number of results returned for TM Engine processing 616 and the efficiency of the query that is sent to the database 614. Factors for optimization may include total number of products in product group VOs 614, total products in the aggregate ranges 606, number of distinct ranges in aggregate ranges 606 (for example, SQL queries are less efficient when the WHERE clauses comprises multiple ranges linked by ORs), gap between ranges in aggregate ranges 606 (e.g., in some embodiments, 101-200 and 301-400 may be grouped into a single range due to their proximity, while 101-200 and 1001-1100 may result in two separate ranges being queried), etc.

Figure 7A:
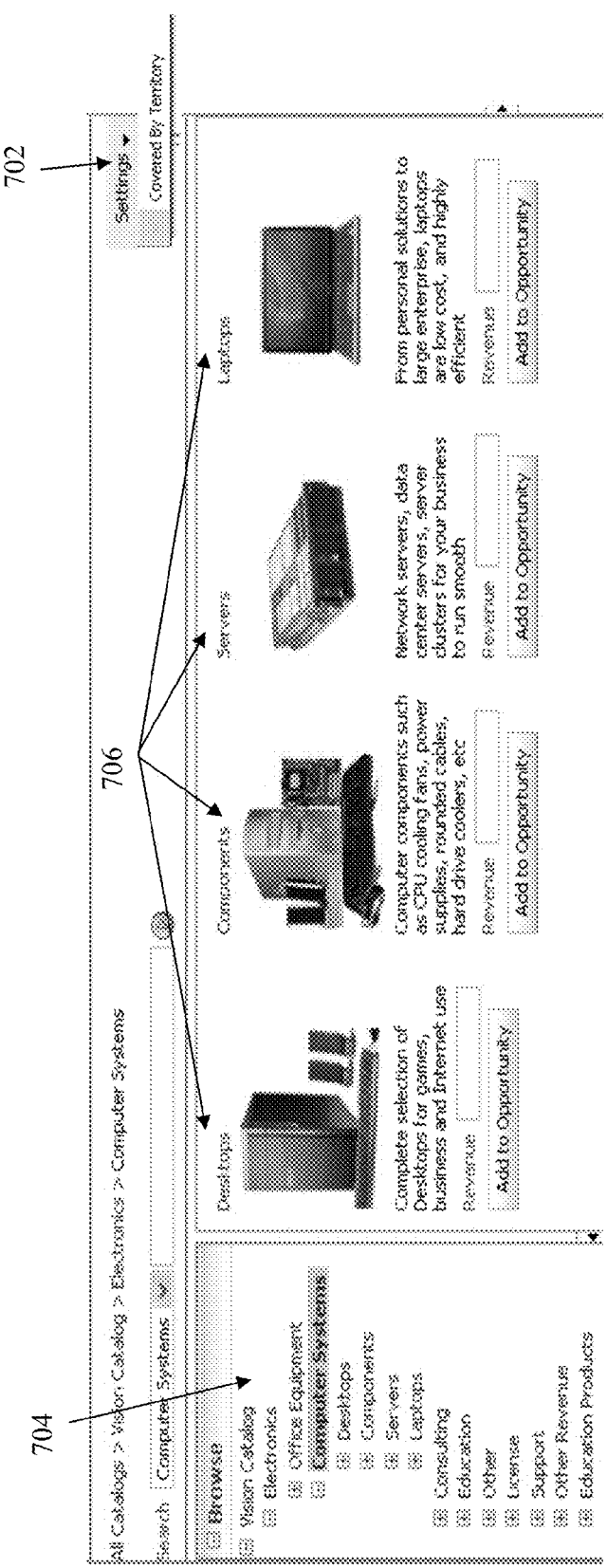
FIGS. 7A-B illustrate a sales catalog interface with TM filtering options in accordance with some embodiments.
Figure 7B:
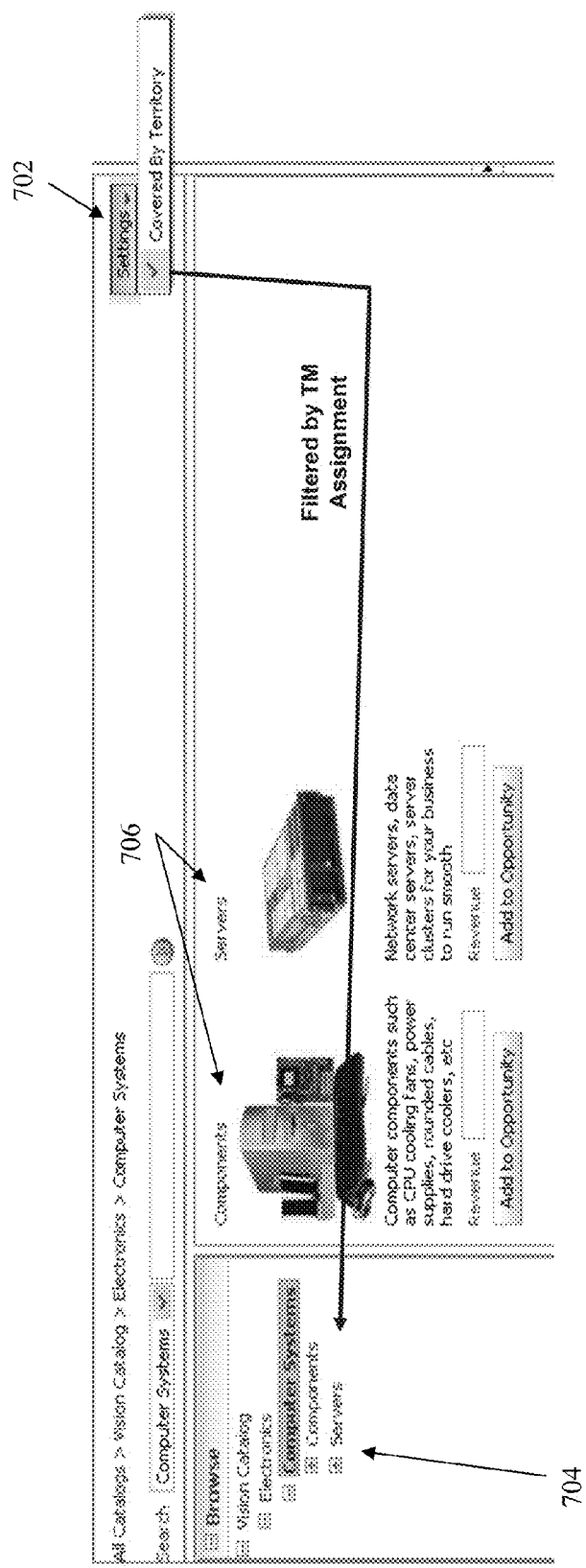

FIGS. 7A-B illustrates integration where TM visibility is enabled during browse runtime. This figure illustrates how the UI looks when the user switches between filtering and non-filtering modes. In other embodiments, the consumer can also disable the user from having such choice, so that TM can be either always filtering or always displaying all of the products. This can be completely driven by the consumer's preference settings.

For example, FIG. 7A illustrates a UI where the user may turn TM filtering on/off at a Settings menu 702 during runtime. When TM filtering is off, a navigation bar 704 that displays product categories and category hierarchies may display all product categories. In addition, content display area 706 will display all products, not just products assigned by the TM to the user. However, as illustrated in FIG. 7B, if TM filtering is turned on by making a appropriate selection at menu 702, navigation bar 704 only displays categories that contain products assigned to the user (e.g., components and servers, but not desktops and laptops), and content display area 706 will only display products assigned to the user.

Engine Integration Pipeline

Figure 8:
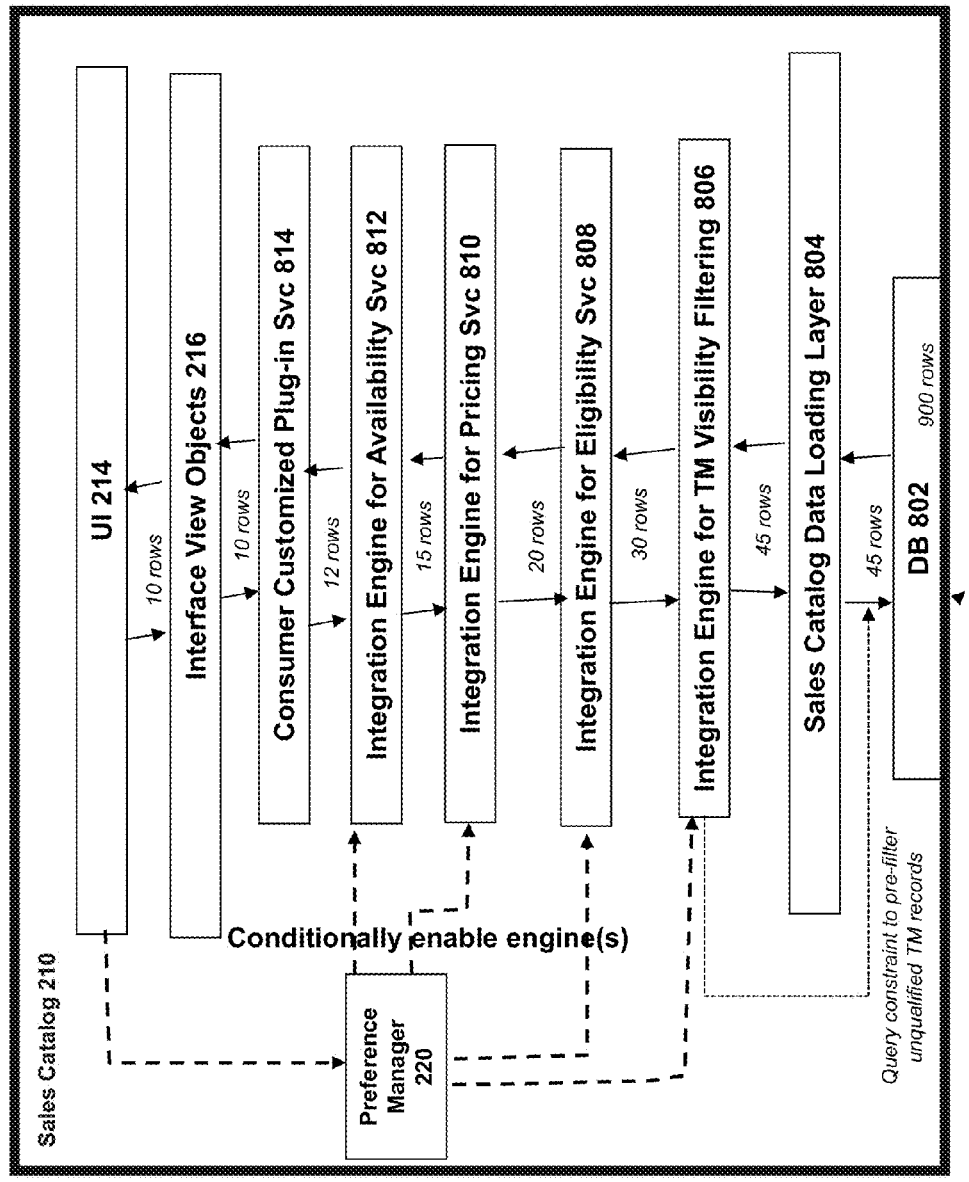
FIG. 8 illustrates an engine pipeline for a sales catalog in accordance with some embodiments.

FIG. 8 illustrates an engine integration pipeline used in some embodiments. The engine pipeline may be layered so that cheaper or less resource intensive engines will be invoked first, so that rows disqualified by these engines will not be sent to more expensive or resource intensive engines for processing. The engines are layered on top of each other, so that one engine will get rows from a prior engine as input and its output will become the input of next engine process in the pipeline. In some embodiments, the order of engines may also be configured based on the selectivity of the engine, such that engines that tend to disqualify or filter out a larger number of rows will tend to be processed first, to reduce the amount of processing to be performed by subsequent engines in the pipeline.

FIG. 8 illustrates data rows passing through a plurality of engines before reaching the UI 214 to be viewed by the user. The engines may include a TM filtering engine 806, an eligibility engine 808, a pricing engine 810, and an availability engine 812. The data may also pass through one or more consumer customized plug-ins 814.

In some embodiments, a consumer may use customized plug-ins 814 to add their own custom code to manipulate the data. For example, a consumer may wish to disable an "add to cart" button when a product conflicts or is not compatible with an existing product in their cart. In some embodiments, the consumers can use the plug-in to not display the product at all. In some embodiments, the plug-in may be used do define additional filters. For example, the consumer may apply a filter so that only products with a Property A or Property B are displayed, wherein Property A and Property B may comprise product data returned by the one or more engines. The filters may not be able to be applied at the engines themselves because they may depend on the output of a different engine. It is understood that in some embodiments, different combinations of different engines may be used, and be arranged in different orders.

The user will be able to select which individual engines to turn on and off through the UI 214. For example, the user may wish to turn on the TM filtering engine 806 and the pricing engine 810, but not the eligibility engine 808 or the availability engine 812. The user would make the appropriate selections at UI 214, which would instruct the preference loader 210 to turn the selected engines on or off. In some embodiments, if the TM engine 806 is turned on, it may append an optimistic SQL constraint corresponding to an overall range or ranges to pre-filter unqualified TM records, so that fewer records need to be loaded to the data loading layer 804.

An engine that is expensive to invoke (e.g., an availability engine 812 processed asynchronously) can be piled on top of a cheaper engine invocation (e.g., a pricing engine 810 processed synchronously), which allows reduction in the number of needed to pass to the external service for processing and which reduces the overall cost of processing. For example, in some embodiments, a TM engine may be invoked first as it can trim down a large number of unqualified rows quickly at the data loading layer 804 through the use of query range pre-filtering. In some embodiments, each engine layer is can be responsible for its own work-set management, where each layer tells the prior layer how many records they need. For example, the UI 214 may pass the number of records to be displayed to the engines, and when each engine calls the prior layer to load data, it may also pass a parameter specifying a number of expected records.

It is up to a prior layer to decide whether and how many further records to ask for from the one before them based on their filtering statistics. For example, the user may only be seeking 10 rows. However, since at the time of eligibility the engine may decide that by average it needs to filter out half of the records, so it might request the prior layer to return 20 records instead. This is so that it only needs to make a single service call to the engines with 20 records, instead of making a first call of 10 records, determining that 5 of them are unqualified and then having to retrieve 10 more records from the prior engine and making another service call. With this approach, each engine might sometime obtain more rows than needed but they will buffer those extra records and to be saved for a future request.

Each engine layer maintains its own work-set, and may invoke external engine services for a group of records to reduce number of calls to external engines, as there is a base overhead for each call itself when the external engine is a web service over the network, even if the call has an empty payload. Each layer maintains filtering rate and projects the number of rows to load from lower layer, and loads accordingly before initiating the service call. In addition, in some embodiments only unprocessed rows will be sent to engine again, and merged back with already processed rows. This configuration helps the engines avoid having to process too many rows or records.

Each engine may be separately controlled by preference settings on the current consumer context and navigation context defined at the preference loader 210. The consumer can pass in additional engine plug-ins at runtime which the catalog may call back for additional processing. In some embodiments, this is used by some consumers to decide whether a partner program or product is valid before rendering.

UI Design

Figure 9:
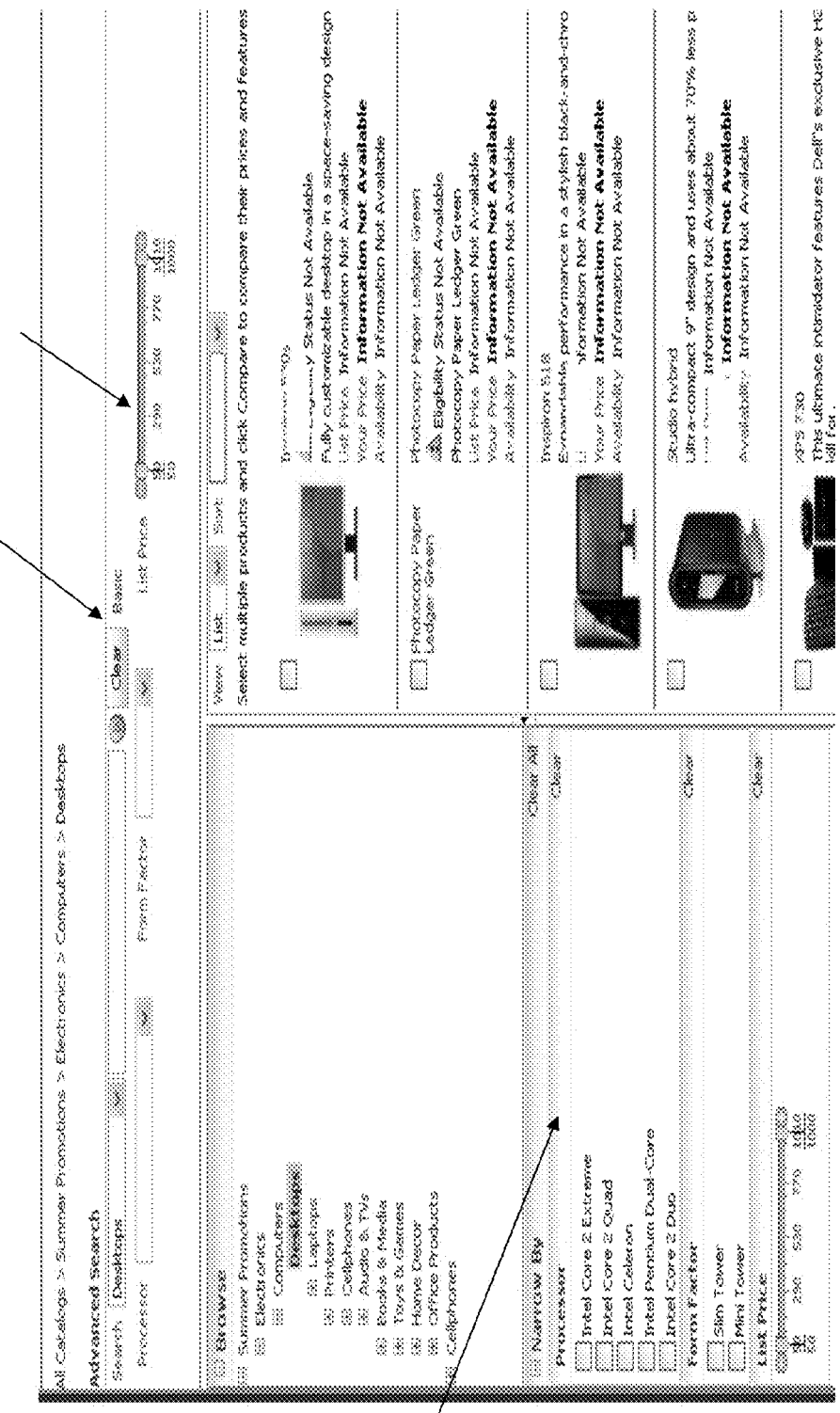
FIG. 9 illustrates search features on a sales catalog user interface in accordance with some embodiments.
Figure 10:
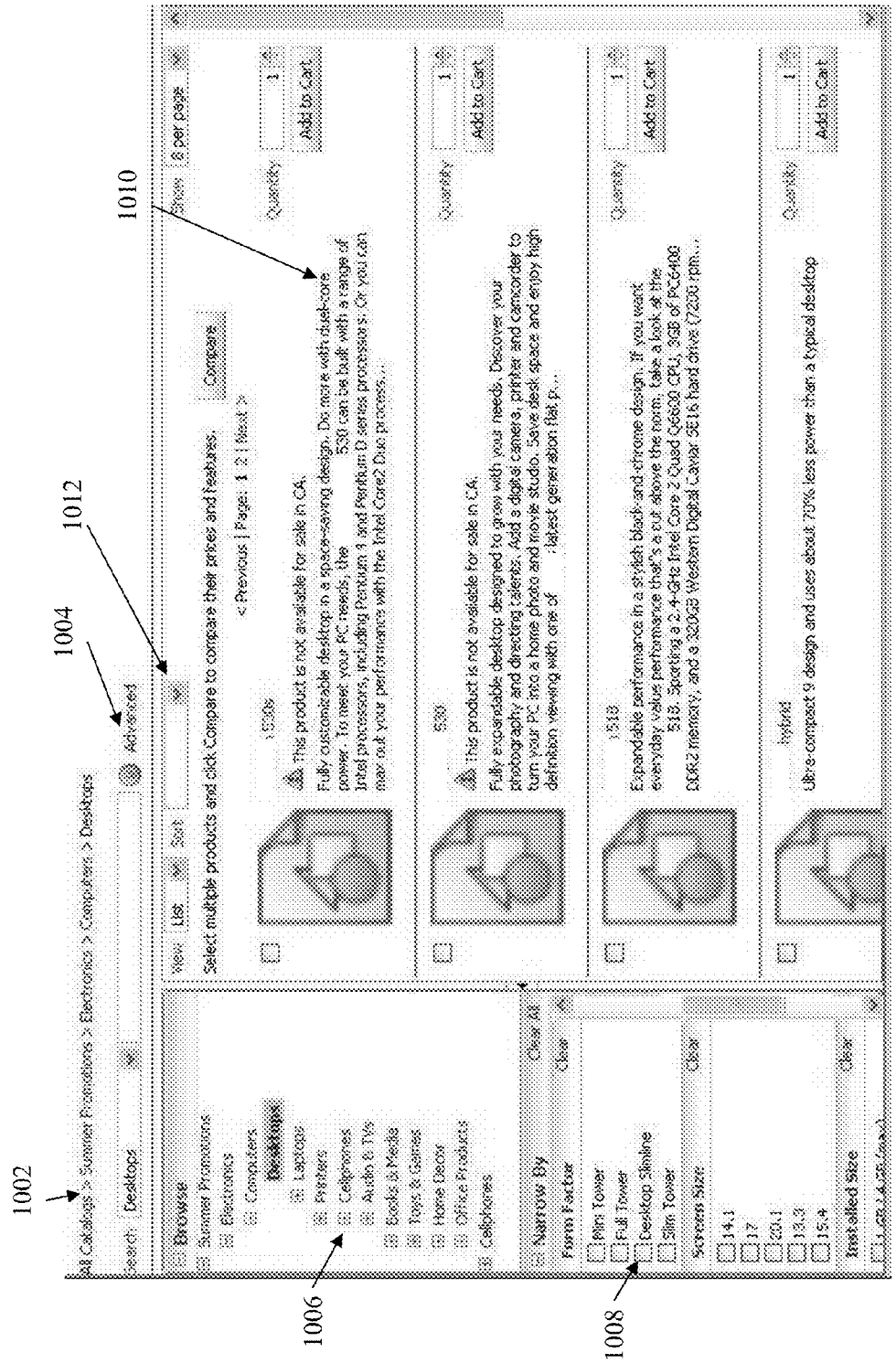
FIG. 10 illustrates sales catalog user interface dependencies in accordance with some embodiments.
Figure 11:
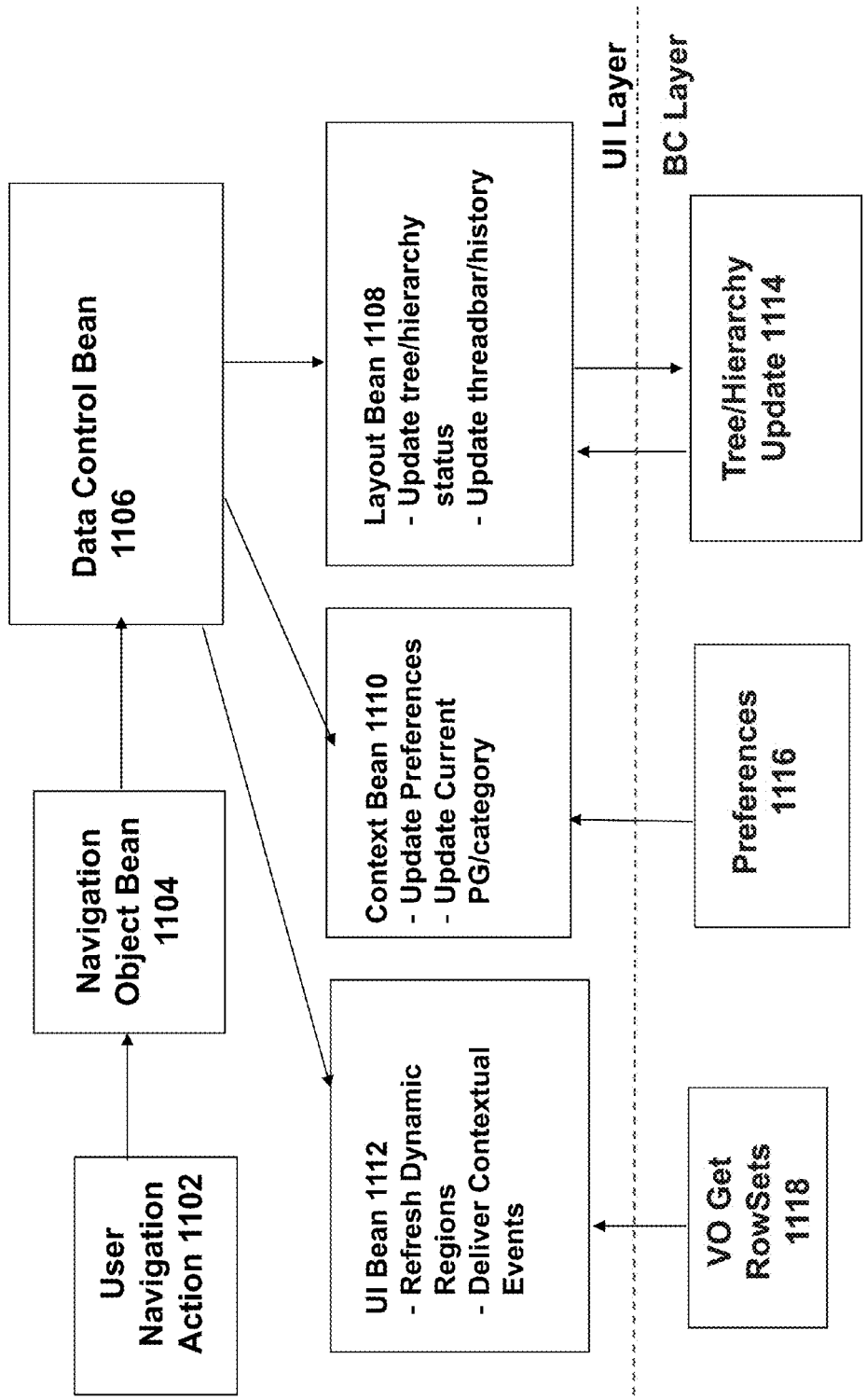
FIG. 11 illustrates a sales catalog UI artifacts lifecycle chart in accordance with some embodiments.

FIGS. 9-11 illustrate a UI design layer in accordance with some embodiments. FIG. 9 illustrates multiple concurrent search mechanisms. One example search mechanism is a quick or basic search 902 allowing a user to search for one or more keywords. In some embodiments, a basic search 902 may also allow a user to specify a product category to search in. Another example is the "advanced search" 904 which may contain additional fields to allow a user to refine their search. For example, advanced search 904 may contain drop down menus allowing a user to select specific product features such as processor or form factor. Advanced search 904 may also contain sliders or other UI features allowing selection of ranges such as price. Yet another example is the "narrow by search" 906 to allow a user to narrow a set of existing search results by specifying one or more parameters or features. All these mechanism can be combined together and/or added on to each other. It will be understood by those skilled in the art that additional search types or configurations may be used.

FIG. 10 illustrates interactions between different display regions in a dynamic UI in accordance with some embodiments. User actions on different parts of the UI may trigger changes in other parts of the UI. For example, hierarchy thread region 1002 displays where a user currently is in a catalog hierarchy. User inputs on the hierarch thread region 1002, such as by clicking one of the groups in the thread, may trigger changes in the search bar region 1004 (e.g., what categories are available to be searched), product display region 1010, navigation browser region 1006, and narrow by region 1008. Similarly, user inputs on navigation browser region 1006 may trigger changes in hierarch thread region 1002, search bar region 1004, product display region 1010, and narrow by region 1008. User inputs in the product display region 1010, such as by clicking on a product, may trigger changes in hierarchy thread region 1002, navigation browser region 1006, and product display settings region 1012. User inputs in narrow by region 1008 and product display settings region 1012 may both trigger changes in product display region 1010.

One challenge is that there may be many correlations and interactions between regions. In addition, it is often difficult to define the correlations at design time, as the UI may not be fixed at design time but is loaded dynamically at runtime. This means that the system may not be able to use standard partial page refresh mechanisms to achieve the interaction.

To address this, some embodiments provide a set of configurable beans to centralize the handling of navigation event. In addition, dynamic generation is provided for navigation bean objects. Dynamic triggering is also provided for UI refresh operations.

FIG. 11 illustrates a UI artifacts lifecycle in accordance with some embodiments. This figure particularly shows, for example, management of beans during the UI artifacts lifecycle. A set of UI artifacts are shown that are involved in a typical user UI navigation action (e.g., selecting a category in the tree or a product in the product list, etc.). This shows the beans used in UI rendering and their respective interactions.

At 1102, the user performs an action at an UI, such as clicking on a product category or entering a search. A navigation object bean 1104 is created comprising information on the user action (what was the user action, catalog context when user action occurred, etc.). The navigation object bean 1104 is processed by a data control bean 1106, which notifies other instance beans to perform various functions. These may include a layout bean 1108, context bean 1110, and UI bean 1112.

The layout bean 1108 updates the status for global layout objects, such as tree and thread bars. For example, products and categories in the sales catalog may be organized in a tree hierarchy or other type of hierarchical data structure. The layout bean 1108 updates a tree or hierarchy status to reflect the current context of the user (e.g., where the user is in the tree/hierarchy). The layout bean 1108 may also update a thread bar, wherein the thread bar may correspond to a history of where the user has been in the tree or hierarchy. The layout bean 1108 may interface with a tree update module 1114 to update the tree status.

The context bean 1110 will be responsible for updating preferences based on the navigation context (e.g., current category or product group) using stored preferences 1116. In some embodiments, there may be different preferences depending on where the user is in the sales catalog. For example, different product categories or product groups may have different preferences associated with them. The context bean 1110 updates category or product group that the user is currently in, and updates the current preferences based on the user's catalog context.

The UI bean 1112 will be responsible to decide which regions of the UI to refresh and delivers a contextual event to make it happen. UI bean 1112 may retrieve the content for the refresh from a get VO rowsets module 1118 to be displayed in the UI.

Preference Settings

In some embodiments, the sales catalog system may be used by different types of users or consumers, and launched from different programs. The user/consumer type and type of program launching the sales catalog may determine the use case for the sales catalog. Different use cases of the sales catalog may have different display modes that determine what kinds of UI layout configurations and engine configurations may be used. For example, a sales/opportunity application launching the sales catalog may be configured to have price and eligibility engines turned on by default, while a marketing application that launches the sales catalog may not have these engines turned on.

Figure 12:
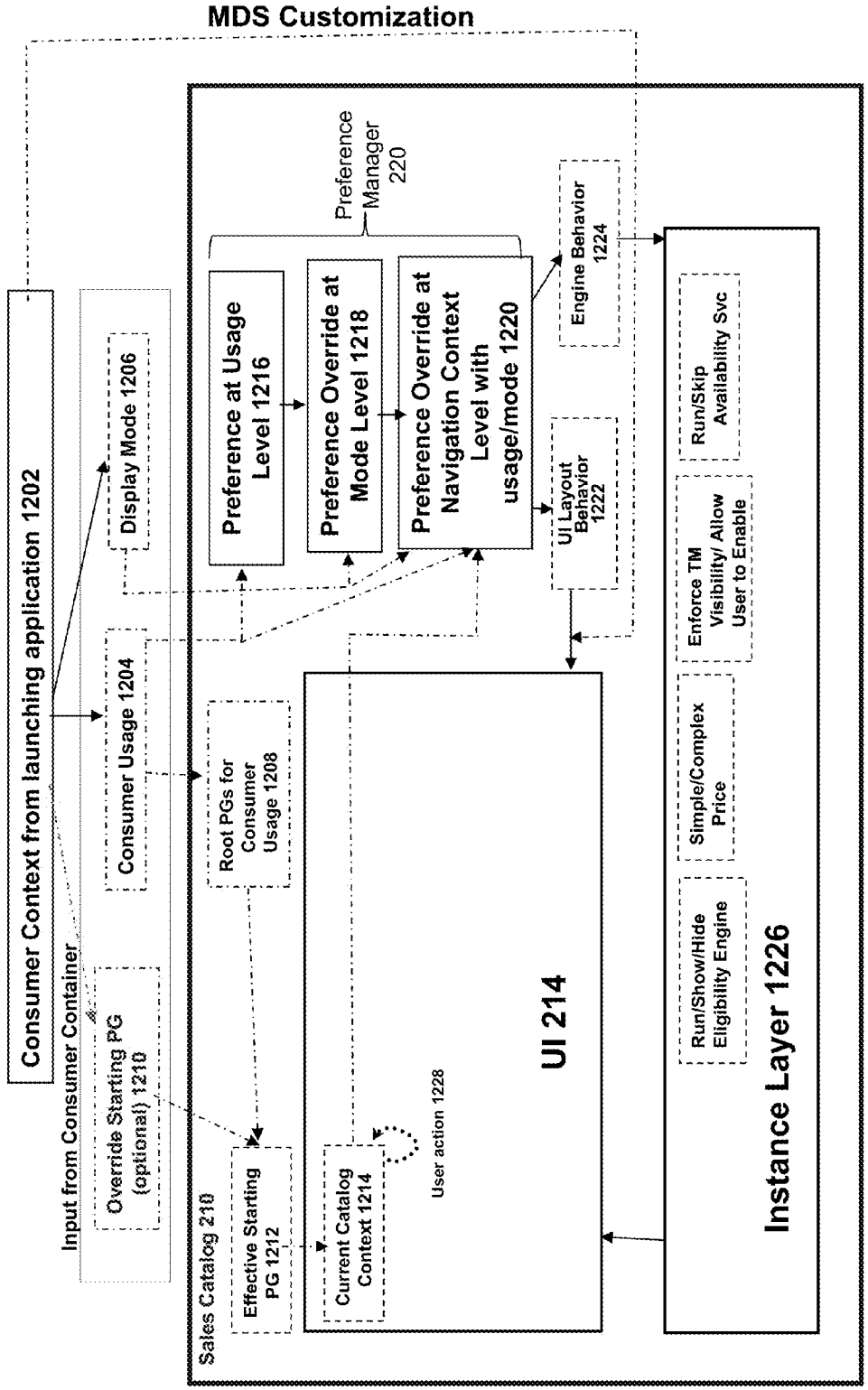
FIG. 12 illustrates an approach for preference settings for a sales catalog in accordance with some embodiments.

FIG. 12 illustrates an example approach for managing settings and preferences in accordance with some embodiments. Both catalog layout and engine selection may controlled by a preference manager.

The sales catalog may be embedded within another application, and its layer and behavior controlled by either/both the consumer usage context 1204 (e.g., which application the catalog is embedded within) or the display mode 1206 that the consumer elects to use. For example, a single consumer (e.g., an opportunity application) may have multiple display modes that may be used. The usage/mode 1204/1206 can be passed as input arguments from the consumer context 1202, which can be derived from other context information such as customer type, flow type, etc.

The consumer usage context 1204 may be used to decide the default root product groups (PGs) 1208 to display. In some embodiments, this can be further overridden if the consumer passes in an optional product group 1210 as starting point. For example, a sales rep using an Opportunity service may have marked that a customer is interested in the "Computer" product category. When launching the sales catalog, the "Computer" category may thus be used as the starting product group 1210. The starting product group 1212 is thus determined from the consumer usage context and the presence or absence of an override product group 1210. The current catalog context 1214 receives the starting product group 1212 as a starting point. After launching the sales catalog, the user may change the current catalog context 1214 through user actions and selections 1228 at UI 214.

The behavior of the catalog may be controlled through a preference manager 220 comprising multiple layers. First, settings at a usage layer 1216 defined by consumer usage 1204 may be used, then settings at mode layer 1218 defined by a display mode 1206 may be used, and then the settings at current product group navigation context layer 1220. The settings for the context layer 1220 can be specific to a particular usage 1204 and/or mode 1206. In some embodiments, preference settings for the sales catalog can be overridden based on the priority order described above.

The preference manager can control both UI layout behavior 1222 and engine behavior 1224 (e.g., which engines to run and how to run). In some embodiments, the preference manager conditionally turn on/off engines and render the UI based on consumer usage context 1204 and display mode 1206. In some embodiments, the behaviors controlled by the preferences may also be based upon user actions 1228 in the sales catalog or product selection UI.

In some embodiments, the behavior set by the preference manager contains two parts. The first part is the UI layout behavior 1222, which decides what layout or taskflow to use to render various component of sales catalog runtime, such as product list, category list, search, product details and product comparisons. In some embodiments, preference settings at the preference manager may affect what layout to use in different UI containers and/or each section of the UI (catalog, category, search, narrow by, comparison, details, etc.).

In some embodiments, the customer can further customize the layout through metadata services using a common metadata services layer. For example, preference and/or personalization settings of an overall sales framework that the sales catalog is a part of may be stored in the common metadata services layer, and may be used to further fine-tune the final layout and behavior of the UI.

The second part of behavior is the engine behavior 1224, which may include whether to run certain engines, how to present the engine results, whether to show the engine status or filter by the engine status, and/or whether to run different flavors of the engine. The engine behavior 1224 may also have an impact on the layout of UI 214 as well, such as what actions the user is allowed to do and what information the user can see on UI 214.

The engine behavior 1124 defines which engines to use in the instance layer 1226 and how they will be used. For example, in some embodiments, the pricing engine may be run as a simple price or a complex price. The eligibility engine may be run and the result shown, run and not shown (hidden), or not run at all. A TM filter may be configured to be run (filter), not run (no filtering), or be subject to user choice (e.g., FIG. 7). An availability engine may be configured to run or not run.

In some embodiments, the manager may be used to specify different implementations for the engines. For example, if the consumer or user doesn't like a pricing engine for dynamically calculating prices, they can have a simple lookup instead of using a full-blown pricing engine, and instead use direct joins to retrieve price information from a 1-1 pricing table, if one exists. In some embodiments, consumers can specify cache behavior and lifecycle of the cache for different engines. For example, will the cached list price need to be recalculated when a shopping cart is changed, when the customer type is changed, or when a user session is changed?

In addition, specifications can be made by the preference manager 210 as to how product images are to be rendered and how business logic should be triggered. For example, in some embodiments product images can be retrieved from a content repository each time they are needed, or retrieved from a dedicated image sever. In some embodiments, users can specify whether certain business logic should be triggered, such as recommendations. In some embodiments, consumers can create their own engines to display additional info to the end user, or filter out unwanted products. Different consumer can have different settings based on their requirements, and don't have pay the cost of loading extra engines.

Figure 13:
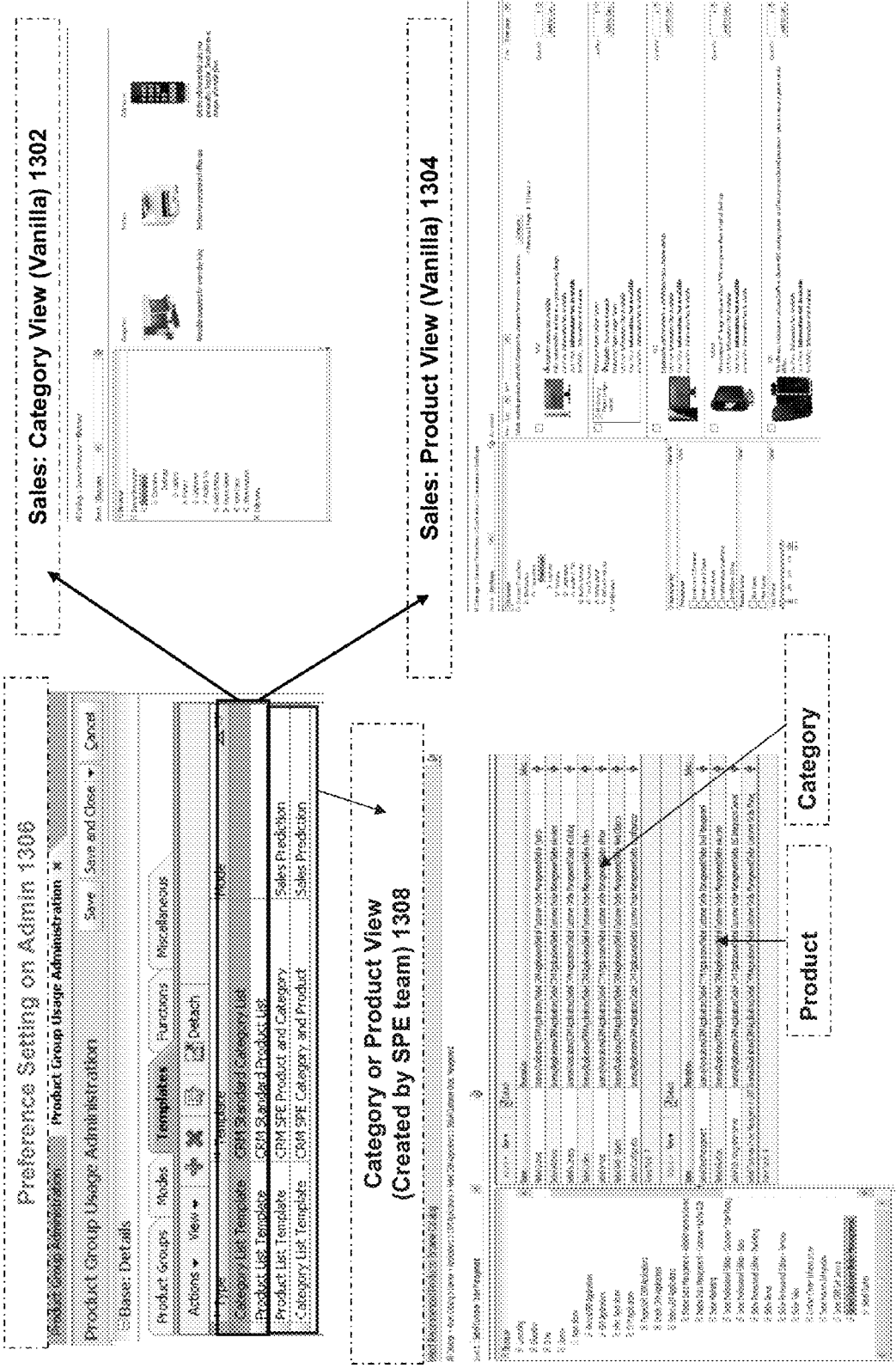
FIG. 13 illustrates UI customization for a sales catalog in accordance with some embodiments.

FIG. 13 illustrates customization of a UI for browsing a sales catalog in accordance with some embodiments, providing an example of how consumers can leverage the preference settings for the UI. On the right hand side, shown is an example vanilla category 1302 and product view 1304 delivered and used by an opportunity team. This can be a fancier UI, e.g., with pictures of products. For example, the category view UI 1302 may contain images corresponding to different categories (e.g., computers) that the user may select to view products in that category using the product view UI 1304.

On left hand side, shown is an example of a SPE team's customization of the UI using an admin panel 1306, where the tree navigation is retained but the preference is for a more concise table layout 1308 for data entry and comparison, e.g., without pictures of the products. This may be implemented by registering the specific UI in the preference settings and launching the same taskflow for browsing the sales catalog, where the user will receive different behaviors with the navigation model. Thus different UI layouts may be displayed based on consumer context, such as whether the sales catalog is launched through opportunity or SPE.

In some embodiments, the sales catalog may be implemented with an architecture that allows one to quickly introduce new catalogs and to add new products to existing catalogs. The architecture may expose catalogs via a call center and web channels. In addition, it permits one to publish catalogs to resellers and customers, while allowing the user to easily search and compare products. The sales catalog may provide product details, accurate pricing and product availability information to aid product selection, while controlling access to the catalogs. An example framework for introducing new catalogs and hierarchies, and updating existing catalogs is described in U.S. patent application Ser. No. 14/015,553, "Method and System For Implementing Version of a Sales Catalog", which is hereby incorporated by reference in its entirety.

The architecture may support grouping of products into product groups, and multi-tiered hierarchies for selling and roll-up needs and re-use of sub-groups across multiple parent groups to minimize administration costs (e.g., by not having to create the same groups more than once). In addition, internal and competitor products, plus promotions, may be supported. It can be used everywhere where grouping of products is needed (e.g., forecasting, territory assignment, pricing, contracts, return policies, catalog, white space analysis, eligibility, promotion) and is architected for very high performance queries across the hierarchy (e.g. get all products within this product group hierarchy). An example framework for product group mappings and hierarchies is described in U.S. patent application Ser. No. 14/015,560, "METHOD AND SYSTEM FOR IMPLEMENTING PRODUCT GROUP MAPPINGS", which is hereby incorporated by reference in its entirety.

Therefore, what has been described above is an improved approach to implement a more efficient architecture for a sales catalog. In some embodiments, the architecture provides the user the ability to controllably view the data with certain engines either running or not running, so that certain items of detailed information is either displayed or not displayed to the user.

System Architecture Overview

Figure 14:
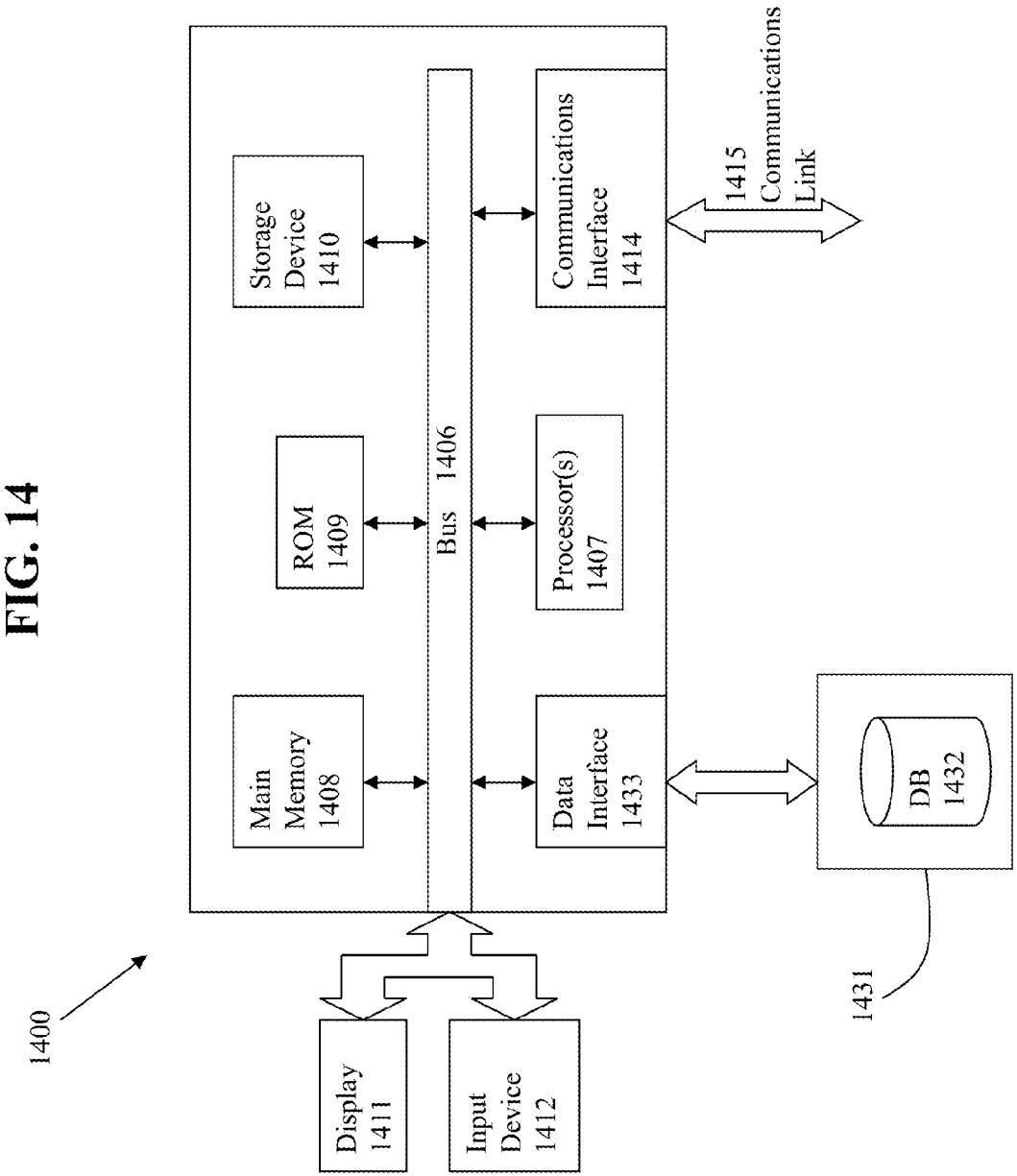
FIG. 14 illustrates a computerized system on which an embodiment of the invention can be implemented.

FIG. 14 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be stored in a database 1432 on a storage medium 1431 which is accessed through data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented by a processor, comprising:
identifying a dataset from a first database, wherein the dataset comprising a plurality of rows in a relational database table;
identifying a plurality of engines for processing the dataset;

receiving an access request to the first database;
processing the dataset using two or more engines of the plurality of engines to retrieve additional data not in the plurality of rows of the relational database table of the first database by:
  retrieving a plurality of records from the first database,
  generating a header view object including context information corresponding to the access request to the first database stored in a header view object,
  removing, at a first engine of the two or more engines, one or more records of the plurality of records from the first database by processing the plurality of records at a first engine of the two or more engines to generate a reduced set of records of the plurality of records based on at least the context information corresponding to the access to the first database,
  checking a set of cached data using the context information and a first portion of data from the reduced set of records to determine if a portion of the additional data has been previously retrieved by a second engine,
  storing values in fields of the reduced set of records corresponding to the first portion of data, the values retrieved from corresponding entries in the set of cached data and used to populate previously empty fields of the reduced set of records,
  generating a request view object comprising a second portion of data from the reduced set of records, the request view object and the second portion of data having corresponding empty fields,
  executing a request at the second engine of the two or more of the engines to retrieve the additional data from a second database corresponding to the second portion of data from the reduced set of records using an input row set, the input row set comprising information from the header view object and information from the request view object, wherein the second engine is accessed using an interface module,
  receiving an output row set from the second engine over the interface module, the output row set comprising the input row set with previously empty fields of the input row set populated by the second engine with corresponding additional data, wherein the corresponding additional data comprises at least some of the additional data retrieved from the second database,
  storing values of the corresponding additional data retrieved from the second database in previously empty fields of the reduced set of records corresponding to the second portion of data using the output row set,
  storing data corresponding to the output row set in the set of cached data, and
  generating a first data object to be displayed from the reduced set of records, wherein a first set of one or more fields in the first data object are populated by the dataset from the first database, a second set of one or more fields in the first data object are populated with previously retrieved additional data, and a third set of one or more fields in the first data object are populated with the corresponding additional data retrieved by the second engine from the second database, wherein the previously retrieved additional data comprises at least some data stored in the set of cached data before the an access request to the first database is received; and
  providing a user interface for viewing a plurality of database objects including the first data object having data from the first database, the set of cached data, and the second database.

2. The method of claim 1, further comprising receiving one or more inputs from a user specifying user interface layouts for regions of the user interface.

3. The method of claim 1, further comprising retrieving data from multiple data sources and mappings.

4. The method of claim 3, further comprising merging, sorting, or de-duplicating the data retrieved from the multiple data sources and mappings.

5. The method of claim 1, further comprising determining a layout of the dataset to be displayed, wherein determining the layout and identifying the engines is based at least in part upon a consumer context.

6. The method of claim 1, wherein the plurality of engines are configured to retrieve information outside of the dataset.

7. The method of claim 6, wherein the information retrieved by the plurality of engines is based at least in part upon a consumer context.

8. The method of claim 7, wherein the consumer context comprises account type information or geographic information.

9. The method of claim 1, in which engine integration is performed using a synchronous web service call, an asynchronous web service call, direct loading through one or more SQL joins, or a callback to a consumer plugin.

10. The method of claim 1, wherein the dataset is used by a CRM application.

11. A non-transitory computer readable medium having stored thereon a sequence of instructions which, when executed by a processor causes the processor to execute a process comprising:
  identifying a dataset from a first database, wherein the dataset comprising at least a plurality of rows in a relational database table;
  identifying a plurality of engines for processing the dataset;
  receiving an access request to the first database;
  processing the dataset using two or more engines of the plurality of engines to retrieve additional data not in the plurality of rows of the relational database table of the first database by:
    retrieving a plurality of records from the first database,
    generating a header view object including context information corresponding to the access request to the first database stored in a header view object,
    removing, at a first engine of the two or more engines, one or more records of the plurality of records from the first database by processing the plurality of records at a first engine of the two or more engines to generate a reduced set of records of the plurality of records based on at least the context information corresponding to the access to the first database,
    checking a set of cached data using the context information and a first portion of data from the reduced set of records to determine if a portion of the additional data has been previously retrieved by a second engine,
    storing values in fields of the reduced set of records corresponding to the first portion of data, the values retrieved from corresponding entries in the set of cached data and used to populate previously empty fields of the reduced set of records,
    generating a request view object comprising a second portion of data from the reduced set of records, the request view object and the second portion of data having corresponding empty fields, executing a request at the second engine of the two or more of the engines to retrieve the additional data from a second database corresponding to the second portion of data from the reduced set of records using an input row set, the input row set comprising information from the header view object and information from the request view object, wherein the second engine is accessed using an interface module, receiving an output row set from the second engine over the interface module, the output row set comprising the input row set with previously empty fields of the input row set populated by the second engine with corresponding additional data, wherein the corresponding additional data comprises at least some of the additional data retrieved from the second database, storing values of the corresponding additional data retrieved from the second database in previously empty fields of the reduced set of records corresponding to the second portion of data using the output row set, storing data corresponding to the output row set in the set of cached data, and generating a first data object to be displayed from the reduced set of records, wherein a first set of one or more fields in the first data object are populated by the dataset from the first database, a second set of one or more fields in the first data object are populated with previously retrieved additional data, and a third set of one or more fields in the first data object are populated with the corresponding additional data retrieved by the second engine from the second database, wherein the previously retrieved additional data comprises at least some data stored in the set of cached data before the access request to the first database is received; and providing a user interface for viewing a plurality of database objects including the first data object having data from the first database, the set of cached data, and the second database.

12. The computer readable medium of claim 11, the process further comprising receiving one or more inputs from a user specifying user interface layouts for regions of the user interface.

13. The computer readable medium of claim 11, the process further comprising retrieving data from multiple data sources and mappings.

14. The computer readable medium of claim 13, the process further comprising merging, sorting, or de-duplicating the data retrieved from the multiple data sources and mappings.

15. The computer readable medium of claim 11, the process further comprising determining a layout of the dataset to be displayed, wherein determining the layout and identifying the engines is based at least in part upon a consumer context.

16. The computer readable medium of claim 11, wherein the plurality of engines are configured to retrieve information outside of the dataset.

17. The computer readable medium of claim 16, wherein the information retrieved by the plurality of engines is based at least in part upon a consumer context.

18. The computer readable medium of claim 17, wherein the consumer context comprises account type information or geographic information.

19. The computer readable medium of claim 11, in which engine integration is performed using a synchronous web service call, an asynchronous web service call, direct loading through one or more SQL joins, or a callback to a consumer plugin.

20. The computer readable medium of claim 11, wherein the dataset is used by a CRM application.

21. A system, comprising:

a processor;

a memory comprising computer code executed using the processor, in which the computer code implements:

identifying a dataset from a first database, wherein the dataset comprising a plurality of rows in a relational database table;

identifying a plurality of engines for processing the dataset;

receiving an access request to the first database;

processing the dataset using two or more engines of the plurality of engines to retrieve additional data not in the plurality of rows of the relational database table of the first database by:

retrieving a plurality of records from the first database, generating a header view object including context information corresponding to the access request to the first database stored in a header view object, removing, at a first engine of the two or more engines, one or more records of the plurality of records from the first database by processing the plurality of records at a first engine of the two or more engines to generate a reduced set of records of the plurality of records based on at least the context information corresponding to the access to the first database, checking a set of cached data using the context information and a first portion of data from the reduced set of records to determine if a portion of the additional data has been previously retrieved by a second engine, storing values in fields of the reduced set of records corresponding to the first portion of data, the values retrieved from corresponding entries in the set of cached data and used to populate previously empty fields of the reduced set of records, generating a request view object comprising a second portion of data from the reduced set of records, the request view object and the second portion of data having corresponding empty fields, executing a request at the second engine of the two or more of the engines to retrieve the additional data from a second database corresponding to the second portion of data from the reduced set of records using an input row set, the input row set comprising information from the header view object and information from the request view object, wherein the second engine is accessed using an interface module, receiving an output row set from the second engine over the interface module, the output row set comprising the input row set with previously empty fields of the input row set populated by the second engine with corresponding additional data, wherein the corresponding additional data comprises at least some of the additional data retrieved from the second database, storing values of the corresponding additional data retrieved from the second database in previously empty fields of the reduced set of records corresponding to the second portion of data using the output row set, storing data corresponding to the output row set in the set of cached data, and generating a first data object to be displayed from the reduced set of records, wherein a first set of one or more fields in the first data object are populated by the dataset from the first database, a second set of one or more fields in the first data object are populated with previously retrieved additional data, and a third set of one or more fields in the first data object are populated with the corresponding additional data retrieved by the second engine from the second database, wherein the previously retrieved additional data comprises at least some data stored in the set of cached data before the access request to the first database is received; and providing a user interface for viewing a plurality of database objects including the first data object having data from the first database, the set of cached data, and the second database.

22. The system of claim 21, further comprising receiving one or more inputs from a user specifying user interface layouts for regions of the user interface.

23. The system of claim 21, further comprising retrieving data from multiple data sources and mappings.

24. The system of claim 23, further comprising merging, sorting, or de-duplicating the data retrieved from the multiple data sources and mappings.

25. The system of claim 21, further comprising determining a layout of the dataset to be displayed, wherein determining the layout and identifying the engines is based at least in part upon a consumer context.

26. The system of claim 21, wherein the plurality of engines are configured to retrieve information outside of the dataset.

27. The system of claim 26, wherein the information retrieved by the plurality of engines is based at least in part upon a consumer context.

28. The system of claim 27, wherein the consumer context comprises account type information or geographic information.

29. The system of claim 21, in which engine integration is performed using a synchronous web service call, an asynchronous web service call, direct loading through one or more SQL joins, or a callback to a consumer plugin.

30. The system of claim 21,
wherein the computer code further implements:
receiving one or more inputs from a user specifying user interface layouts for regions of the user interface,
retrieving data from multiple data sources and mappings, and merging, sorting, or de-duplicating the data retrieved from the multiple data sources and mappings,
determining a layout of the dataset to be displayed, determining the layout and identifying the engines being based at least in part upon a consumer context, the consumer context comprises account type information, geographic information, a current view, a requested view, customer location information, user credentials, account type, the context information being cached, at least some user preferences are overridden based on at least a current context; and
wherein:

at least some of the additional data is retrieved by providing the header view object and the request view object to a respective engine, in real time, and asynchronously by refreshing the user interface with asynchronously retrieved data,
engines of the plurality of engines are integrate using synchronous web service call, asynchronous web service call, SQL calls, and callbacks to one or more plugins,
the plurality of engines including a pricing engine, an availability engine, a compatibility engine, and a territory management engine, wherein the compatibility engine controllably displays compatible products or incompatible products to selected products selected by a respective user, the selected products comprising products within a shopping cart, the plurality of engines being layered and receive rows from a preceding engine,
the dataset is used by a CRM application,
the plurality of engines being part of a sales catalog system further comprising a data loading framework, an interface view layer, and a preferences settings manager, the interface view layer providing view objects to user interface.

31. The method of claim 1,
further comprising:
receiving one or more inputs from a user specifying user interface layouts for regions of the user interface,
retrieving data from multiple data sources and mappings, and merging, sorting, or de-duplicating the data retrieved from the multiple data sources and mappings,
determining a layout of the dataset to be displayed, determining the layout and identifying the engines being based at least in part upon a consumer context, the consumer context comprises account type information, geographic information, a current view, a requested view, customer location information, user credentials, account type, the context information being cached, at least some user preferences are overridden based on at least a current context; and
wherein:
at least some of the additional data is retrieved by providing the header view object and the request view object to a respective engine, in real time, and asynchronously by refreshing the user interface with asynchronously retrieved data,
engines of the plurality of engines are integrate using synchronous web service call, asynchronous web service call, SQL calls, and callbacks to one or more plugins,
the plurality of engines including a pricing engine, an availability engine, a compatibility engine, and a territory management engine, wherein the compatibility engine controllably displays compatible products or incompatible products to selected products selected by a respective user, the selected products comprising products within a shopping cart, the plurality of engines being layered and receive rows from a preceding engine,
the dataset is used by a CRM application,
the plurality of engines being part of a sales catalog system further comprising a data loading framework, an interface view layer, and a preferences settings manager, the interface view layer providing view objects to user interface.

32. The computer readable medium of claim 11, the process further comprising:
- receiving one or more inputs from a user specifying user interface layouts for regions of the user interface,
- retrieving data from multiple data sources and mappings, and merging, sorting, or de-duplicating the data retrieved from the multiple data sources and mappings,
- determining a layout of the dataset to be displayed, determining the layout and identifying the engines being based at least in part upon a consumer context, the consumer context comprises account type information, geographic information, a current view, a requested view, customer location information, user credentials, account type, the context information being cached, at least some user preferences are overridden based on at least a current context; and wherein:
- at least some of the additional data is retrieved by providing the header view object and the request view object to a respective engine, in real time, and asynchronously by refreshing the user interface with asynchronously retrieved data,
- engines of the plurality of engines are integrate using synchronous web service call, asynchronous web service call, SQL calls, and callbacks to one or more plugins,
- the plurality of engines including a pricing engine, an availability engine, a compatibility engine, and a territory management engine, wherein the compatibility engine controllably displays compatible products or incompatible products to selected products selected by a respective user, the selected products comprising products within a shopping cart, the plurality of engines being layered and receive rows from a preceding engine,
- the dataset is used by a CRM application,
- the plurality of engines being part of a sales catalog system further comprising a data loading framework, an interface view layer, and a preferences settings manager, the interface view layer providing view objects to user interface.

* * * * *

UNITED STATES PATENT AND TRADEMARK OFFICE
CERTIFICATE OF CORRECTION

PATENT NO. : 9,953,353 B2
APPLICATION NO. : 14/015546
DATED : April 24, 2018
INVENTOR(S) : Singhal et al.

Page 1 of 1

It is certified that error appears in the above-identified patent and that said Letters Patent is hereby corrected as shown below:

In the Specification

In Column 5, Line 60, delete "that that" and insert -- that --, therefor.

In Column 14, Line 40, delete "to" and insert -- be --, therefor.

In Column 22, Line 38, delete "PTSN," and insert -- PSTN, --, therefor.

In the Claims

In Column 23, Line 66, in Claim 1, after "the" delete "an".

In Column 24, Line 36, in Claim 11, after "comprising" delete "at least".

Signed and Sealed this
Sixth Day of November, 2018

Andrei Iancu
*Director of the United States Patent and Trademark Office*